US012181113B2

(12) United States Patent
Van Bommel et al.

(10) Patent No.: US 12,181,113 B2
(45) Date of Patent: Dec. 31, 2024

(54) RGB LED ARCHITECTURE FOR COLOR CONTROLLABLE LED FILAMENT

(71) Applicant: SIGNIFY HOLDING B.V., Eindhoven (NL)

(72) Inventors: Ties Van Bommel, Horst (NL); Rifat Ata Mustafa Hikmet, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/281,323

(22) PCT Filed: Feb. 23, 2022

(86) PCT No.: PCT/EP2022/054535
§ 371 (c)(1),
(2) Date: Sep. 11, 2023

(87) PCT Pub. No.: WO2022/189150
PCT Pub. Date: Sep. 15, 2022

(65) Prior Publication Data

US 2024/0151369 A1 May 9, 2024

(30) Foreign Application Priority Data

Mar. 12, 2021 (EP) .................................... 21162415

(51) Int. Cl.

| | |
|---|---|
| ***F21K 9/232*** | (2016.01) |
| ***F21Y 105/12*** | (2016.01) |
| ***F21Y 105/16*** | (2016.01) |
| ***F21Y 113/13*** | (2016.01) |
| ***F21Y 115/10*** | (2016.01) |

(52) U.S. Cl.
CPC ........... *F21K 9/232* (2016.08); *F21Y 2105/12* (2016.08); *F21Y 2105/16* (2016.08); *F21Y 2113/13* (2016.08); *F21Y 2115/10* (2016.08)

(58) Field of Classification Search
CPC ............................ F21K 9/232; F21Y 2105/12
See application file for complete search history.

(56) References Cited

U.S. PATENT DOCUMENTS

| | | | | |
|---|---|---|---|---|
| 9,967,943 | B1 * | 5/2018 | Wang | F21K 9/238 |
| 2017/0012177 | A1 * | 1/2017 | Trottier | F21K 9/00 |
| 2018/0328543 | A1 | 11/2018 | Bergmann et al. | |
| 2020/0144230 | A1 * | 5/2020 | Lin | H01L 33/62 |
| 2020/0303355 | A1 | 9/2020 | Wang et al. | |

(Continued)

FOREIGN PATENT DOCUMENTS

| | | | |
|---|---|---|---|
| DE | 102011000657 | A1 | 8/2012 |
| WO | 2019179228 | A1 | 9/2019 |

(Continued)

*Primary Examiner* — William N Harris

(57) ABSTRACT

An LED filament device is provided with a LED filament that has a plurality of sources of light. The sources of light are configured in an k*1 array with k=2 columns, and the array has a first set of at least 20 sources of light distributed over the columns. In a first column of the first set at least 90% of the total number of sources of light are selected from the group of (i) first sources of light and fifth sources of light. In a second column of the first set at least 80% of the total number of sources of light are selected from the group of second sources of light, third sources of light and fourth sources of light.

15 Claims, 8 Drawing Sheets

(56) References Cited

U.S. PATENT DOCUMENTS

| | | | |
|---|---|---|---|
| 2020/0303356 | A1 | 9/2020 | Li et al. |
| 2020/0332962 | A1* | 10/2020 | Chen ..................... F21V 19/001 |
| 2022/0390074 | A1 | 12/2022 | Van Der Lubbe et al. |

FOREIGN PATENT DOCUMENTS

| | | | |
|---|---|---|---|
| WO | 2020152068 | A1 | 7/2020 |
| WO | 2021013675 | A1 | 1/2021 |

* cited by examiner

RGB LED ARCHITECTURE FOR COLOR CONTROLLABLE LED FILAMENT

CROSS-REFERENCE TO PRIOR APPLICATIONS

This application is the U.S. National Phase application under 35 U.S.C. § 371 of International Application No. PCT/EP2022/054535, filed on Feb. 23, 2022, which claims the benefit of European Patent Application No. 21162415.0, filed on Mar. 12, 2021. These applications are hereby incorporated by reference herein.

FIELD OF THE INVENTION

The invention relates to a device as well as to a retrofit lamp, or other lighting device, comprising such device. The invention also relates to a LED filament device for such device.

BACKGROUND OF THE INVENTION

LED filament lamps are known in the art. US2018/0328543, for instance, describes a lamp comprising an optically transmissive enclosure for emitting an emitted light; a base connected to the enclosure; at least one first LED filament and at least one second LED filament in the enclosure operable to emit light when energized through an electrical path from the base, the at least one first LED filament emitting light having a first correlated color temperature (CCT) and the at least one second LED filament emitting light having a second CCT that are combined to generate the emitted light; and a controller that changes the CCT of the emitted light when the lamp is dimmed. The optically transmissive enclosure is transparent.

SUMMARY OF THE INVENTION

Incandescent lamps are rapidly being replaced by LED based lighting solutions. It may nevertheless be appreciated and desired by users to have retrofit lamps which have the look of an incandescent bulb. For this purpose, one may make use of the infrastructure for producing incandescent lamps based on glass and replace the filament with LEDs emitting white light. One of the concepts is based on LED filaments placed in such a bulb. The appearances of these lamps are highly appreciated as they look highly decorative.

Current LED filament lamps are not color controllable. For producing color controllable LED filament lamps one can make use of RGB LEDs on a (for instance translucent or transparent) substrate. However, such configuration may not provide a pleasant appearance.

Hence, it is an aspect of the invention to provide an alternative light generating device, which preferably further at least partly obviates one or more of above-described drawbacks. The present invention may have as object to overcome or ameliorate at least one of the disadvantages of the prior art, or to provide a useful alternative.

Amongst others, the invention provides in embodiments instead of using three columns with EWW (extreme warm white)+CW (cool white)+green and blue, and optionally red, to use a LED filament with two columns of LEDs wherein the EWW+CW+green and blue, and optionally red, is distributed over the two columns of the LED filament. Herein, amongst others specific distributions are proposed, wherein EWW and CW may e.g. be in different columns. However, other configurations are not excluded herein.

In an aspect, the invention provides a LED filament device comprising a LED filament. Especially, the LED filament comprises a plurality of sources of light. In embodiments, the sources of light are configured in an k*l array, with in specific embodiments at least k=2 columns (410, 420). Further, in embodiments, the array may comprise a first set of at least 20 sources of light distributed over the columns (410,420). Especially, in embodiments in a first column of the first set at least 90% of the total number of sources of light may be selected from the group of (i) first sources of light and fifth sources of light. In yet further specific embodiments at least 40% of the total number of sources of light may comprise first sources of light. Yet further, in specific embodiments 0-60% of the total number of sources of light may comprise fifth sources of light. Especially, in embodiments in a second column of the first set at least 80% of the total number of sources of light may be selected from the group of second sources of light, third sources of light and fourth sources of light. Yet further, especially in the second column of the first set at least 20% of the total number of sources of light may comprise second sources of light, at least 20% of the total number of sources of light may comprise third sources of light, and at least 20% of the total number of sources of light may comprise fourth sources of light. Further, in embodiments the first sources of light are configured to generate first (white) light having a first correlated color temperature CCT1, the second sources of light are configured to generate second (white) light having a second correlated color temperature CCT2. Yet, in embodiments, the third sources of light may be configured to generate blue third light, the fourth sources of light may be configured to generate green fourth light, and the fifth sources of light may be configured to generate red fifth light. Especially, in embodiments CCT1 is selected from the range of at maximum 2400 K, CCT2 is selected from the range of at least 2300 K, more especially at least 2700 K, and CCT2-CCT1≥500 K. In specific embodiments, the sources of light may comprise solid state light sources.

With the present invention it may be possible provide white light, which may in embodiments have a relatively low correlated color temperature (CCT). Further, with the present invention it may be possible to provide colored light. Yet, further, the color point of the light may be controllable. However, with the present invention it may be possible to control color point while also reducing a pixelated appearance. Hence, in embodiments a line like lighting device may be provided, which may provide a line of light (which may be relatively homogeneous (and which may have a relatively low or no spotty appearance)). Further, the present invention provides an RGB LED architecture for a color controllable LED filament.

In embodiments, the invention provides a LED filament device comprising a LED filament. Especially, the LED filament comprises a plurality of sources of light. In embodiments, the plurality of sources of light comprises first sources of light, second sources of light, third sources of light, and fourth sources of light. In other embodiments, the plurality of sources of light comprises first sources of light, second sources of light, third sources of light, fourth sources of light, and fifth sources of light. During operation, the LED filament device may provide filament device light ("device light") which may comprise the light of one or more of (these types of) sources of light.

As indicated above, the LED filament device is especially configured to generate filament device light (during operation of the LED filament device). The filament device light is especially the light that escapes from the LED filament device during operation of the LED filament device.

The LED filament device may comprise one or more LED filaments ("filaments"). The invention will in general further be described in relation to a single filament. However, as will be clear there may be more than one filament. Hence, the LED filament device may in specific embodiments comprise a plurality of LED filaments. When there is more than one filament, these may provide during an operational mode (in embodiments) light having different optical properties or light having essentially the same optical properties.

When there is more than one LED filament, the LED filaments may not necessarily be the same. For instance, there may be two or more LED filaments having different numbers of solid state light sources. Alternatively or additionally, there may be two or more LED filaments having different shapes. Alternatively or additionally, there may be two or more LED filaments configured to generate filament light having different spectral power distributions. Alternatively or additionally, there may be two or more LED filaments having different spectral power distribution turnabilities.

Further, there may be sets of LED filaments, wherein a set comprises two or more LED filaments which may be essentially identical, such as in number of solid state light sources and in filament light spectral power distribution, wherein the LED filaments within a set do (thus) essentially not mutually differ (in terms of spectral power distribution of the filament light), whereas LED filaments from different sets may mutually differ (especially in filament light spectral power distributions).

As indicated above, the invention provides a LED filament device comprising a LED filament. Especially, the LED filament comprises a plurality of sources of light. Herein, the term "source of light" is used when referring in embodiments to light sources, such as solid state light sources, of which the light is used as such, and in embodiments to combinations of light sources, such as solid state light sources, with luminescent material, wherein at least also the luminescent material light may be used. Hence, in specific embodiments the term "source of light" may refer to one or more of (i) a solid state light source, like a direct LED, (ii) a phosphor converted light source, like a PC LED, and (iii) a combination of a solid state light source and luminescent material, such as may be available in a light transmissive coating material wherein one or more solid state light sources are embedded. Hence, the plurality of sources of light especially comprises a plurality of solid state light sources. In specific embodiments, each source of light may comprise a solid state light source, such as a LED. Hence, when referring to pitches of sources of light below, this may especially refer to pitches of the respective solid state light sources.

The term "light source" may in principle relate to any light source known in the art. In a specific embodiment, the light source comprises a solid state LED light source (such as a LED or laser diode (or "diode laser")). The term "light source" may also relate to a plurality of light sources, such as 2-200 (solid state) LED light sources. Hence, the term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of light semiconductor light source may be configured on the same substrate. In embodiments, a COB is a multi LED chip configured together as a single lighting module.

The light source has a light escape surface. Referring to conventional light sources such as light bulbs or fluorescent lamps, it may be outer surface of the glass or quartz envelope. For LED's it may for instance be the LED die, or when a resin is applied to the LED die, the outer surface of the resin. In principle, it may also be the terminal end of a fiber. The term escape surface especially relates to that part of the light source, where the light actually leaves or escapes from the light source. The light source is configured to provide a beam of light. This beam of light (thus) escapes form the light exit surface of the light source.

The term "light source" may refer to a semiconductor light-emitting device, such as a light emitting diode (LEDs), a resonant cavity light emitting diode (RCLED), a vertical cavity laser diode (VCSELs), an edge emitting laser, etc. . . . . The term "light source" may also refer to an organic light-emitting diode, such as a passive-matrix (PMOLED) or an active-matrix (AMOLED). In a specific embodiment, the light source comprises a solid-state light source (such as a LED or laser diode). In an embodiment, the light source comprises a LED (light emitting diode). The terms "light source" or "solid state light source" may also refer to a superluminescent diode (SLED).

The term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of semiconductor light sources may be configured on the same substrate. In embodiments, a COB is a multi LED chip configured together as a single lighting module.

The term "light source" may also relate to a plurality of (essentially identical (or different)) light sources, such as 2-2000 solid state light sources. In embodiments, the light source may comprise one or more micro-optical elements (array of micro lenses) downstream of a single solid-state light source, such as a LED, or downstream of a plurality of solid-state light sources (i.e. e.g. shared by multiple LEDs). In embodiments, the light source may comprise a LED with on-chip optics. In embodiments, the light source comprises a pixelated single LEDs (with or without optics) (offering in embodiments on-chip beam steering).

The terms "upstream" and "downstream" relate to an arrangement of items or features relative to the propagation of the light from a light generating means (here the especially the light source), wherein relative to a first position within a beam of light from the light generating means, a second position in the beam of light closer to the light generating means is "upstream", and a third position within the beam of light further away from the light generating means is "downstream".

In embodiments, the light source may be configured to provide primary radiation, which is used as such, such as e.g. a blue light source, like a blue LED, or a green light source, such as a green LED, and a red light source, such as a red LED. Such LEDs, which may not comprise a luminescent material ("phosphor") may be indicated as direct color LEDs.

In other embodiments, however, the light source may be configured to provide primary radiation and (at least) part of the primary radiation is converted into secondary radiation. Secondary radiation may be based on conversion by a luminescent material. The secondary radiation may therefore also be indicated as luminescent material radiation. The luminescent material may in embodiments be comprised by the light source, such as a LED with a luminescent material layer or dome comprising luminescent material. Such LEDs may be indicated as phosphor converted LEDs or PC LEDs. In other embodiments, the luminescent material may be configured at some distance ("remote") from the light source, such as a LED with a luminescent material layer not in physical contact with a die of the LED. Hence, in specific embodiments the light source may be a light source that during operation emits at least light at wavelength selected from the range of 380-470 nm. However, other wavelengths may also be possible. This light may partially be used by the (optional) luminescent material.

In embodiments, the light source may be selected from the group of laser diodes and superluminescent LEDs. In other embodiments, the light sources comprises LEDs.

The term "laser light source" especially refers to a laser. Such laser may especially be configured to generate laser light source light having one or more wavelengths in the UV, visible, or infrared, especially having a wavelength selected from the spectral wavelength range of 200-2000 nm, such as 300-1500 nm. The term "laser" especially refers to a device that emits light through a process of optical amplification based on the stimulated emission of electromagnetic radiation. Especially, in embodiments the term "laser" may refer to a solid-state laser. In specific embodiments, the terms "laser" or "laser light source", or similar terms, refer to a laser diode (or diode laser).

Hence, in embodiments the light source comprises a laser light source. In embodiments, the terms "laser" or "solid state laser" may refer to one or more of cerium doped lithium strontium (or calcium) aluminum fluoride (Ce:LiSAF, Ce:LiCAF), chromium doped chrysoberyl (alexandrite) laser, chromium ZnSe (Cr:ZnSe) laser, divalent samarium doped calcium fluoride (Sm:$CaF_2$) laser, Er:YAG laser, erbium doped and erbium-ytterbium codoped glass lasers, F-Center laser, holmium YAG (Ho:YAG) laser, Nd:YAG laser, NdCrYAG laser, neodymium doped yttrium calcium oxoborate Nd:$YCa_4O(BO_3)_3$ or Nd:YCOB, neodymium doped yttrium orthovanadate (Nd:$YVO_4$) laser, neodymium glass (Nd:glass) laser, neodymium YLF (Nd:YLF) solid-state laser, promethium 147 doped phosphate glass (147$Pm^{3+}$:glass) solid-state laser, ruby laser ($Al_2O_3$:$Cr^{3+}$), thulium YAG (Tm:YAG) laser, titanium sapphire (Ti:sapphire; $Al_2O_3$:$Ti^{3+}$) laser, trivalent uranium doped calcium fluoride (U:$CaF_2$) solid-state laser, Ytterbium doped glass laser (rod, plate/chip, and fiber), Ytterbium YAG (Yb:YAG) laser, $Yb_2O_3$(glass or ceramics) laser, etc.

In embodiments, the terms "laser" or "solid state laser" may refer to one or more of a semiconductor laser diode, such as GaN, InGaN, AlGaInP, AlGaAs, InGaAsP, lead salt, vertical cavity surface emitting laser (VCSEL), quantum cascade laser, hybrid silicon laser, etc.

A laser may be combined with an upconverter in order to arrive at shorter (laser) wavelengths. For instance, with some (trivalent) rare earth ions upconversion may be obtained or with non-linear crystals upconversion can be obtained. Alternatively, a laser can be combined with a downconverter, such as a dye laser, to arrive at longer (laser) wavelengths.

As can be derived from the below, the term "laser light source" may also refer to a plurality of (different or identical) laser light sources. In specific embodiments, the term "laser light source" may refer to a plurality N of (identical) laser light sources. In embodiments, N=2, or more. In specific embodiments, N may be at least 5, such as especially at least 8. In this way, a higher brightness may be obtained. In embodiments, laser light sources may be arranged in a laser bank (see also above). The laser bank may in embodiments comprise heat sinking and/or optics e.g. a lens to collimate the laser light.

The laser light source is configured to generate laser light source light (or "laser light"). The light source light may essentially consist of the laser light source light. The light source light may also comprise laser light source light of two or more (different or identical) laser light sources. For instance, the laser light source light of two or more (different or identical) laser light sources may be coupled into a light guide, to provide a single beam of light comprising the laser light source light of the two or more (different or identical) laser light sources. In specific embodiments, the light source light is thus especially collimated light source light. In yet further embodiments, the light source light is especially (collimated) laser light source light.

The phrases "different light sources" or "a plurality of different light sources", and similar phrases, may in embodiments refer to a plurality of solid-state light sources selected from at least two different bins. Likewise, the phrases "identical light sources" or "a plurality of same light sources", and similar phrases, may in embodiments refer to a plurality of solid-state light sources selected from the same bin.

The filament may comprise a support and solid state light sources, supported by the support. Especially, the filament may comprise a (light transmissive) encapsulant which may at least partly enclose the solid state light source(s), especially at least enclose the light emitting surface(s) of the solid state light sources(s), such as the die(s).

The LED filament may in embodiments comprises a support, a set of solid state light sources ("light sources"), and an encapsulant. The LED filament may have a length axis having a first length (L1). Especially, the solid state light sources are arranged over the first length (L1) of the LED filament on the support. Further, the solid state light sources are configured to generate light source light (during operation of the light generating device). Especially, in embodiments the encapsulant encloses at least part of each of the solid state light sources of the set of solid state light sources. In general, the filaments may have aspect ratios of length and width, and of length and height, of at least 10, such as selected from the range of 10-10,000. The aspect ratios of different filaments may in specific embodiments differ, though in embodiments the aspect ratios may essentially be the same. Note that for a filament the aspect ratio of the length and width and the aspect ratio of the length and height may differ.

The support may in embodiments comprise one or more of (metal) leads and resin (material). In specific embodiments, the support may comprise a flexible PCB. In specific embodiments, the support may comprise a polymeric support, e.g. a polyimide support. In specific embodiments, the support may comprise a light transmissive polymeric support. The support may be flexible. In embodiments, the support may comprise a foil.

Further, in embodiments the encapsulant may comprise a luminescent material configured to convert at least part of the light source light into luminescent material light. Alternatively or additionally, one or more of the one or more solid state light sources may comprise a luminescent material, and the encapsulant may in embodiments be transparent or translucent.

Yet alternatively or additionally, the solid state light sources may be configured to generate solid state light source light without conversion material comprised by the solid state light source, i.e. the light of the solid state light source may have a spectral power distribution essentially the same as escaping from the die. Also in such embodiments, the (optional) encapsulant may in embodiments be transparent or translucent.

Especially, the filament may be configured to generate filament light (during an operational mode of the respective filament). The filament light may comprise one or more of luminescent material light and solid state light source light (of solid state light sources without luminescent material). The luminescent material light may be from PC solid state light sources, i.e. phosphor converter solid state light sources, or from luminescent material in the encapsulant. Solid state light sources without luminescent material may herein also be indicated as non-PC solid state light sources or direct color LEDs.

As indicated above, the LED filament device may comprise an LED filament, wherein the LED filament comprises a support, a set of solid state light sources, and an encapsulant.

The number of (solid state) light sources in the LED filament may be at least 20, such as at least 24, like at least 40, such as at least 48, and may e.g. be up to 100, or yet even larger. Especially, in embodiments the number of (solid state) light sources in the set may be selected from the range of 20-1000, such as 10-200.

Hence, in embodiments one or more sources of light may each comprise a solid state light source. Alternatively or additionally, in embodiments one or more sources of light may each comprise a solid state light source with a luminescent material, i.e. in embodiments PC LEDs.

Especially, there are at least four different sources of light, which may be used to generate light having mutually different spectral power distributions. Hence, in embodiments the plurality of sources of light comprises first sources of light, second sources of light, third sources of light, and fourth sources of light. Further, in embodiments fifth sources of light may be available.

Especially, the sources of light are configured in an array with 2-3 columns, especially with essentially only two columns. This allows a relatively narrow filament which may be more flexible and/or may be easier to produce and/or to apply.

In general, a first column may comprise a single pitch, or subsets of a plurality of sources of light having a single (first) pitch (within the subset), wherein the subsets as such may have another pitch ((first) set pitch). In specific embodiments, however, the plurality of light sources of the first column essentially all may have the same (first) pitch. Further, a second column may comprise a single (second) pitch, or subsets of a plurality of sources of light having a single pitch (within the subset), wherein the subsets as such may have another pitch ((second) set pitch). In specific embodiments, however, the plurality of light sources of the second column essentially all may have the same (second) pitch. In specific embodiments, the pitches of the first column and of the second column may essentially be the same.

In embodiments, the sources of light may be configured in an k*l array, such as especially with k=2 columns (410,420). In specific embodiments, the array comprises a first set of at least 20 sources of light distributed over the columns (410, 420). In embodiments, the array may also comprise a plurality of such first sets. Alternatively or additionally, in embodiments the array may comprise a first set of more than 20 sources of light, like e.g. at least 40, such as up to 1000, though larger number may also be possible. Instead of the term "first set" also the term "set" may be applied.

Hence, the array may comprise at least two columns. Especially, the array comprises two columns, and no further columns. Hence, in embodiments the LED filament device may comprise an array of sources of light with only two columns. Therefore, in embodiments the set may also only comprise two columns. Herein, the columns of the set are also indicated as "column". However, in embodiments they may also be indicated as "column parts". The array may thus comprise a first column and a second column; the set may thus comprise a (part of the) first column and a (part of the) second column.

The at least 20 sources of light are distributed over the columns. In general, the number of sources of light in the columns may be about the same. Hence, assuming two columns, the number of sources of light in the first column (of the first set) may be 40-60% of the total number of sources of light in the array (of the first set), and the number of sources of light in the second column (of the first set) may be 60-40% of the total number of sources of light in the array (of the first set). Especially, in embodiments the number of sources of light in the first column (of the first set) may be 45-55% of the total number of sources of light in the array (of the first set), and the number of sources of light in the second column (of the first set) may be 55-45% of the total number of sources of light in the array (of the first set), such as each about 50%.

In embodiments, in a first column of the first set at least 80%, such as especially at least 90% of the total number of sources of light may be selected from the group of (i) first sources of light and fifth sources of light. Hence, other sources of light may be available in the first column, but only in a relatively low percentage. In specific embodiments, in the first column of the first set at least 95%, such as at least 97 of the total number of sources of light may be selected from the group of (i) first sources of light and fifth sources of light. Especially, in embodiments, in the first column of the first set 100%, of the total number of sources of light may be selected from the group of (i) first sources of light and fifth sources of light.

The first column at least comprises first sources of light and may optionally comprise fifth sources of light. Especially, in embodiments the first column of the first set at least 40% of the total number of sources of light may comprise first sources of light, and 0-60% (or 60-0%) of the total number of sources of light comprising fifth sources of light. As will be further elucidated below, in embodiments the first sources of light are configured to provide (warm) white and the fifth sources of light are configured to provide red light.

In embodiments, in a second column of the first set at least 70%, even more especially at least 80% of the total number of sources of light are selected from the group of second sources of light, third sources of light and fourth sources of light. Hence, other sources of light may be available in the second column, but only in a relatively low percentage.

The second column may at least comprise second sources of light, third sources of light and fourth sources of light. In embodiments, in the second column of the first set at least 20% of the total number of sources of light comprise second sources of light, at least 20% of the total number of sources of light comprise third sources of light, and at least 20% of the total number of sources of light comprise fourth sources of light.

Yet even more especially, in embodiments, in the second column of the first set at least 25% of the total number of sources of light comprise second sources of light, at least 25% of the total number of sources of light comprise third sources of light, and at least 25% of the total number of sources of light comprise fourth sources of light. Yet even more especially, in embodiments, in the second column of the first set at least 30% of the total number of sources of light comprise second sources of light, at least 30% of the total number of sources of light comprise third sources of light, and at least 30% of the total number of sources of light comprise fourth sources of light. Yet, in embodiments, each of the second sources of light, third sources of light, and fourth sources of light provide one third of the total number of sources of light in the second column of the first set.

Therefore, in specific embodiments, in the second column of the first set at least 90%, such as especially at least 95% of the total number of sources of light may be selected from the group of second sources of light, third sources of light and fourth sources of light. In yet further specific embodiments, in the second column of the first set 100% of the total number of sources of light may be selected from the group of second sources of light, third sources of light and fourth sources of light.

In embodiments, the number of the second sources of light, the third sources of light, and the fourth sources of light may be about equal. Hence, especially in embodiments a number n3 of third sources of light, a number n4 of fourth sources of light, and a number n5 of fifth sources of light may mutually differ at maximum within 15% of an average value for n3, n4, and n5 (i.e. an average value for n3+n4+n5).

The fifth sources of light may optionally be available. Especially, when the fifth sources of light are available in the array, they may especially be available in the first column. Hence, in embodiments for the first set may apply that more than 50% of a total number of first sources of light in the first set are configured in the first column of the array, even more especially at least 75%, such as at least 80%, like at least 90%. In further specific embodiments, when fifth sources of light are available, they are available in the first column (of the first set) only.

The sources of light of the first column and the sources of light of the second column may each individually be configured in (virtual) sections. Hence, these section in the first column may have the same first pitch and these section in the second column may have the same second pitch. In embodiments, the sections of the first column in the first subset and the section of the second column in the second subset may be aligned in such a way, that the from rows. These rows may have thus the pitch of the first sources of light and of the second sources of light (in the subsets). Hence, in specific embodiments the sources of light are configured in rows (over the two columns).

However, the sections of the first column and the section of the second may also be translated relative to each other with a distance equal to an integer times the first pitch or times the second pitch. For instance, when the sources of light are translated with a half first pitch or a half second pitch, which the pitches being essentially identical, a kind of alternating or zigzag configuration of the sources of light may be obtained.

Hence, in embodiments the sources of light in the first column and the sources of light in the second column may have the same pitches and may be aligned, whereby (essentially all) the light sources in the two columns may form rows (over two columns). In other embodiments, the sources of light in the first column and the sources of light in the second column may have the same pitches but are not aligned into rows over two columns. In yet other embodiments, the sources of light in the first column and the sources of light in the second column may have different pitches.

Note that as the sources of light comprise different source of light, specific sources of light, like the first sources of light, the second sources of light, third sources of light, and fourth sources of light (and the fifth sources of light), may have specific pitches associated to that respective source of light, which may thus differ from the first pitch or second pitch, unless one of the columns has a subset of only a single type of sources of light. In specific embodiments, the third sources of light and the fourth sources of light may have the same pitch. In yet other embodiments, the second sources of light, the third sources of light and the fourth sources of light may have the same pitch.

Two subsets or sections in two columns may form a set. Such set may in embodiments represent relevant features of the herein described invention. Further, such set may be available a plurality of times. Hence, in embodiments the set may be a kind of unit cell, which may in embodiments be comprised a plurality of times by the LED filament.

Especially, in embodiments the sources of light (110,120, 130,140) may be configured in an k*l array with in specific embodiments k=2 columns (410,420) and in specific embodiments each l≥8 sections, especially l≥10. Especially, in embodiments the array may comprise at least a single first set of at least $l_1$ sections in each of the columns (410,420), wherein in embodiments $l_1$=10. Especially, in embodiments for the first set may apply that more than 50% of a total number of n1 first sources of light in the first set are configured in a first column of the array and more than 50% of each of n2 second sources of light, n3 third sources of light, and n4 fourth sources of light in the first set are configured in a second column of the array. Further, especially in embodiments n1≥4, n2≥2, n3≥2, and n4≥2.

Yet further, in specific embodiments the first sources of light may be configured to generate first light having a first correlated color temperature CCT1, the second sources of light may be configured to generate second light having a second correlated color temperature CCT2, the third sources of light may be configured to generate blue third light, and the fourth sources of light may be configured to generate green fourth light. In specific embodiments, CCT1 may be selected from the range of at maximum 2400 K, and in specific embodiments CCT2 may be selected from the range of at least 2300 K, such as especially at least 2700. Especially, in embodiments CCT2-CCT1≥500 K may apply.

Hence, in embodiments the invention provides a LED filament device comprising a LED filament, wherein the LED filament comprises a plurality of sources of light, wherein: (a) the sources of light are configured in an k*l array with k=2 columns (410,420); wherein the array comprises a first set of at least 20 sources of light distributed over the columns (410,420); (b) in a first column of the first set at least 90% of the total number of sources of light are selected from the group of (i) first sources of light and fifth sources of light, with at least 40% of the total number of sources of light comprising first sources of light, and with 0-60% of the total number of sources of light comprising fifth sources of light; (c) in a second column of the first set at least 80% of the total number of sources of light are selected from the group of second sources of light, third sources of light and fourth sources of light, and in the second column of the first set at least 20% of the total number of sources of light comprise second sources of light, at least 20% of the total number of sources of light comprise third sources of light, and at least 20% of the total number of sources of light comprise fourth sources of light; (d) the first sources of light are configured to generate first light having a first correlated color temperature CCT1, the second sources of light are configured to generate second light having a second correlated color temperature CCT2, the third sources of light are configured to generate blue third light, the fourth sources of light are configured to generate green fourth light, and the fifth sources of light configured to generate red fifth light; and (e) CCT1 is selected from the range of at maximum 2400 K, CCT2 is selected from the range of at least 2700 K, and CCT2-CCT1≥500 K.

Hence, especially the invention provides in (other) embodiments a LED filament device comprising a LED filament, wherein the LED filament comprises a plurality of sources of light, wherein the plurality of sources of light comprises first sources of light, second sources of light, third sources of light, and fourth sources of light, wherein: (A) the sources of light (110,120,130,140) are configured in an k*l array with k=2 columns (410,420) and each l≥10 sections; wherein the array comprises at least a single first set of at least $l_1$ sections in each of the columns (410,420), wherein $l_1$=10; (B) for the first set applies: more than 50% of a total number of n1 first sources of light in the first set are configured in a first column of the array and more than 50% of each of n2 second sources of light, n3 third sources of light, and n4 fourth sources of light in the first set are configured in a second column of the array; wherein n1≥4, n2≥2, n3≥2, and n4≥2; (C) the first sources of light are configured to generate first light having a first correlated color temperature CCT1, the second sources of light are configured to generate second light having a second correlated color temperature CCT2, the third sources of light are configured to generate blue third light, and the fourth sources of light are configured to generate green fourth light; and (D) CCT1 is selected from the range of at maximum 2400 K, CCT2 is selected from the range of at least 2300 K, and CCT2-CCT1≥500 K.

Therefore, in embodiments the sources of light (110,120,130,140) may be configured in an k*l array with k=2 columns (410,420) and each l≥10 sections. Especially, the array may comprise at least a single first set of at least $l_1$ sections in each of the columns (410,420). Further, especially $l_1$=10 is chosen. The number of sections $l_{11}$ of the first column (in the set) may differ from the number of section $l_{12}$ of the and second column (in the set) in the set. In general, $0 \leq |l_{12}-l_{11}| \leq 1$. Hence, especially in embodiments $l_{12}=l_{11}$.

Especially, one or more of the following may apply for the first set: (i) more than 50% of a total number of n1 first sources of light in the first set are configured in a first column of the array, and (ii) more than 50% of each of n2 second sources of light, n3 third sources of light, and n4 fourth sources of light in the first set are configured in a second column of the array. For instance, the first column in the first set may only consist of first sources of light, and the second column of the first set may only consist of second sources of light, third sources of light, and fourth sources of light. Hence, in specific embodiments for the first set applies: more than 50% of a total number of n1 first sources of light in the first set are configured in a first column of the array and more than 50% of each of n2 second sources of light, n3 third sources of light, and n4 fourth sources of light in the first set are configured in a second column of the array. Further, especially in embodiments, especially wherein $l_1$=10 (i.e. especially wherein $l_{11}=l_{12}$=10, n1≥4, n2≥2, n3≥2, and n4≥2.

Hence, in embodiments for the first column may apply that at least 25%, even more especially at least 40% of the sources of light are first sources of light. Alternatively or additionally, in embodiments for the second column may apply that at least 10%, more especially at least 20% of the sources of light are second sources of light, at least 10%, more especially at least 20% of the sources of light are third sources of light, and at least 10%, more especially at least 20% of the sources of light are third sources of light.

Further, especially in embodiments the first sources of light and the second sources of light may be configured to generate different types of white light. In specific embodiments, the first sources of light may be configured to generate first light having a first correlated color temperature CCT1, and the second sources of light may be configured to generate second light having a second correlated color temperature CCT2. In specific embodiments, CCT1 is smaller than CCT2. Especially, the first sources of light are configured to generate warm white, such as extreme warm white, and the second sources of light are configured to generate cool white. In embodiments, CCT1 may be selected from the range of at maximum 2400 K. Further, in embodiments CCT2 may be selected from the range of at least 2300 K. As indicate above, especially CCT1 is smaller than CCT2, even more especially CCT2-CCT1≥500 K.

Further, in embodiments the third sources of light may be configured to generate blue third light, and the fourth sources of light may be configured to generate green fourth light.

The term "white light" herein, is known to the person skilled in the art. It especially relates to light having a correlated color temperature (CCT) between about 1800 K and 20000 K, such as between 2000 and 20000 K, especially 2700-20000 K, for general lighting especially in the range of about 2700 K and 6500 K. In embodiments, for backlighting purposes the correlated color temperature (CCT) may especially be in the range of about 7000 K and 20000 K. Yet further, in embodiments the correlated color temperature (CCT) is especially within about 15 SDCM (standard deviation of color matching) from the BBL (black body locus), especially within about 10 SDCM from the BBL, even more especially within about 5 SDCM from the BBL. The terms "visible", "visible light" or "visible emission" and similar terms refer to light having one or more wavelengths in the range of about 380-780 nm. Herein, UV may especially refer to a wavelength selected from the range of 200-380 nm. The terms "light" and "radiation" are herein interchangeably used, unless clear from the context that the term "light" only refers to visible light. The terms "light" and "radiation" may thus refer to UV radiation, visible light, and IR radiation. In specific embodiments, especially for lighting applications, the terms "light" and "radiation" refer to (at least) visible light. The terms "violet light" or "violet emission" especially relates to light having a wavelength in the range of about 380-440 nm. The terms "blue light" or "blue emission" especially relate to light having a wavelength in the range of about 440-490 nm (including some violet and cyan hues). The terms "green light" or "green emission" especially relate to light having a wavelength in the range of about 490-560 nm. The terms "yellow light" or "yellow emission" especially relate to light having a wavelength in the range of about 560-590 nm. The terms "orange light" or "orange emission" especially relate to light having a wavelength in the range of about 590-620. The terms "red light" or "red emission" especially relate to light having a wavelength in the range of about 620-750 nm. The term "cyan" may refer to one or more wavelengths selected from the range of about 490-520 nm. The term "amber" may refer to one or more wavelengths selected from the range of about 585-605 nm, such as about 590-600 nm.

In embodiments, the LED filament may be based on blue light emitting solid state light sources and green light emitting solid state light sources, and optionally red light emitting solid state light sources, in addition to white light emitting sources of light. The white light emitting sources of light may especially be based on blue light emitting solid state light and respective luminescent materials (leading to warm white and cool white light, respectively. Instead of green light emitting solid state light sources, also a blue light emitting solid state light source in combination with a green light luminescent material may be applied. Likewise, instead of red light emitting solid state light sources, also a blue light emitting solid state light source in combination with a red light emitting luminescent material may be applied.

The term "luminescent material" especially refers to a material that can convert first radiation, especially one or more of UV radiation and blue radiation, into second radiation. In general, the first radiation and second radiation have different spectral power distributions. Hence, instead of the term "luminescent material", also the terms "luminescent converter" or "converter" may be applied. In general, the second radiation has a spectral power distribution at larger wavelengths than the first radiation, which is the case in the so-called down-conversion. In specific embodiments, however the second radiation has a spectral power distribution with intensity at smaller wavelengths than the first radiation, which is the case in the so-called up-conversion. In embodiments, the "luminescent material" may especially refer to a material that can convert radiation into e.g. visible and/or infrared light. For instance, in embodiments the luminescent material may be able to convert one or more of UV radiation and blue radiation, into visible light. The luminescent material may in specific embodiments also convert radiation into infrared radiation (IR). Hence, upon excitation with radiation, the luminescent material emits radiation. In general, the luminescent material will be a down converter, i.e. radiation of a smaller wavelength is converted into radiation with a larger wavelength ($\lambda_{ex}<\lambda_{em}$), though in specific embodiments the luminescent material may comprise up-converter luminescent material, i.e. radiation of a larger wavelength is converted into radiation with a smaller wavelength ($\lambda_{ex}>\lambda_{em}$). In embodiments, the term "luminescence" may refer to phosphorescence. In embodiments, the term "luminescence" may also refer to fluorescence. Instead of the term "luminescence", also the term "emission" may be applied. Hence, the terms "first radiation" and "second radiation" may refer to excitation radiation and emission (radiation), respectively. Likewise, the term "luminescent material" may in embodiments refer to phosphorescence and/or fluorescence. The term "luminescent material" may also refer to a plurality of different luminescent materials.

In specific embodiments, luminescent materials that are applied to provide white light emitting source of light may be selected from the group of luminescent materials of the type $A_3B_5O_{12}$:Ce, wherein A comprises one or more of Y, La, Gd, Tb and Lu, and wherein B comprises one or more of Al, Ga, In and Sc.

Hence, the sources of light may comprise solid state light sources. Further, one or more sources of light may comprise a luminescent material. The luminescent material may be comprised by the solid state light source, like a PC LED, or may be configured downstream of the solid state light source, like a direct LED with luminescent material configured downstream of the LED, like in a light transmissive material (wherein the luminescent material may be embedded).

As indicated above, in embodiments CCT1 may be selected from the range of at maximum 2400 K, and CCT2 is selected from the range of at least 2700 K. Further, especially, in embodiments CCT2-CCT1≥500 K. In further specific embodiments CCT2 may be at least 3000 K, such as at least 3500 K. Even more especially, CCT is at least 4000 K. In embodiments, CCT may be selected from the range of 2700-4000 K.

In embodiments, in an operational mode the first sources of light in the first set and the third sources of light, and fourth sources of light in the first set may together be configured to provide white device light having a correlated color temperature selected from the range of 2700-4000 K. Hence, with the present invention a large CCT range may be possible, from relatively, selected from the range of 1800-2400 K, to relatively high, like selected from the range of 5500-6500 K.

The lowest correlated color temperature of the device light may especially be based on the light of the first sources of light. However, the correlated color temperature may even be further reduced with admixing e.g. some light of the optional fifth sources of light (see also below). The highest correlated color temperature of the device light may especially be based on the light of the second sources of light. However, by admixing some light of the third sources of light, the correlated temperature may even further be increased.

In embodiments, the fifth sources of light may be configured to generate red light having one or more wavelengths selected from the wavelength range 610-650 nm, more especially from the wavelength range of 620-640 nm. In specific embodiments, the fifth sources of light may be configured to generate red light having peak wavelengths selected from the wavelength range 610-650 nm, more especially from the wavelength range of 620-640 nm. In specific embodiments, the fifth sources of light may be configured to generate red light having centroid wavelengths selected from the wavelength range 610-650 nm, more especially from the wavelength range of 620-640 nm. In embodiments, the fifth sources of light comprise fifth light sources, wherein the fifth light sources are configured to generate fifth light source light having peak wavelengths and/or centroid wavelengths, selected from the wavelength range 610-650 nm, more especially from the wavelength range of 620-640 nm. Especially, the fifth light sources are solid state light sources.

Further, with the present invention the correlated color may be controlled why staying relatively close to the black body locus (BBL). Hence, white light may be provided over a relatively large correlated color temperature range, while staying within 10 SDCM or even less (see also above) from the BBL.

In specific embodiments, CCT1 is selected from the range of at maximum 1700-2400 K, such as selected from the range of 1900-2300 K, and CCT2 is selected from the range of 2500-6500 K, such as selected from the range of 3000-4500K. Especially, in embodiments CCT2-CCT1≥1000 K. Even more especially, in embodiments CCT2-CCT1≥2000 K.

As indicated above, also fifth sources of light may be available. Such fifth sources of light may be configured to generate red light. With the fifth sources of light, optical properties of the device light may further be controlled. The CCT range may be increased, the gamut may be increased, and CRI may also be improved.

It appears useful, especially in view preventing a pixelated effect of the light, when the majority of the fifth sources of light are configured in the same column as the first sources of light. Hence, in specific embodiments the LED filament device may further comprise fifth sources of light configured to generate red fifth light, wherein for the first set applies: more than 50% of a total number of n5 fifth sources of light in the first set are configured in the first column of the array. Further, especially assuming $1_{11}$ is 10 then, n5≥2.

In specific embodiments, at least 80% of the total number of sources of light in the first column are provided by the first sources of light and the fifth sources of light, such as at least 90%, even more especially 100%.

In specific embodiments, in an operational mode the first sources of light (in the first set), the third sources of light (in the first set), the fourth sources of light (in the first set), and the fifth sources of light (in the first set may together be configured to provide white (device) light having a correlated color temperature selected from the range of 2700-4000 K, or even larger, such as up to e.g. 4500 K, or yet even larger.

In specific embodiments, in an operational mode the first sources of light (in the first set), may be configured to provide white device light having a correlated color temperature selected from the range of at maximum 2400 K (see also above).

In specific embodiments, in an operational mode the third sources of light (in the first set), the fourth sources of light (in the first set), and the fifth sources of light (in the first set may together be configured to provide white (device) light having a correlated color temperature selected from the range of 1900-6500 K, especially with a CCT tunable range of at least 1000 K, such as at least 2000 K.

Here, the term CCT tunable range refers to the range defined between a lowest and a highest correlated color temperature in range wherein the color temperature can be controlled.

In specific embodiments, in an operational mode the second sources of light (in the first set), optionally together with one or more of (i) the third sources of light (in the first set), the fourth sources of light (in the first set), and the optional fifth sources of light (in the first set may together be configured to provide white (device) light having a correlated color temperature selected from the range of 2300-6500 K, especially with a CCT tunable range of at least 1000 K, such as at least 2000 K.

In specific embodiments, the first sources of light and the fifth sources of light may be configured in an $(AE)_{m1}$ configuration, wherein A represents the first sources of light, E represents the fifth sources of light, and wherein m1≥2, wherein for each AE configuration applies that between the respective first source of light and the respective fifth source of light there is at maximum one other source of light (i.e . . . . AXEAXE . . . ). Especially, for each AE configuration may apply that between the respective first source of light and the respective fifth source of light there no other source of light (i.e. . . . AEAE . . . ). With such embodiments, when using only the warm white first source of light or only using the fifth sources of light from the first column, pixilation may be relatively low.

The shortest distance between the solid state light sources in a column may in embodiments be ≤3 mm, more especially ≤2 mm, most especially ≤1 mm. Otherwise spottiness may be observed. This is particular the case when solid state light sources are used which emit different colors. The length and width of the solid state light sources may especially be ≤1 mm, more especially ≤0.8 mm, most especially ≤0.7 mm. Especially smaller solid state light sources may be used because not so much light may be needed given the large number of Solid state light sources. Small solid state light sources (less epi) may be cheaper. The pitch between the solid state light sources in a column may in embodiments be especially ≤3 mm, more especially ≤2 mm, most especially ≤1 mm (see above). The shortest distance between solid state light sources in different columns may be small because the architecture may mimic a single filament. The distance may in embodiments be ≤3 mm, more especially ≤2 mm, most especially ≤1 mm. The shortest distance between the solid state light sources in a column may be about the same as the shortest distance between the solid state light sources in different columns.

With respect to the second sources of light, the third sources of light, and the fourth sources of light in the second column, also some configurations may be desirable. Especially, in embodiments the second sources of light (in the first set), the third sources of light (in the first set), and the fourth sources of light (in the first set) are configured in one or more of (i) an $(BDC)_{m2}$ configuration and (ii) an $(BCBD)_{m3}$ configuration, wherein B represents the second sources of light, C represents the third sources of light, D represents the fourth sources of light. Further, in specific embodiments (see also above), the following may apply: m2≥2, and m3≥2.

As indicated above, the sources of light may be configured in rows. Hence, in specific embodiments a plurality of the sources of light in the first column and a plurality of sources of light in the second column may be configured in rows. Therefore, in specific embodiments a plurality of the solid state light sources in the first column and a plurality of solid state light sources in the second column may be configured in rows.

In specific embodiments, the fifth sources of light in the first column and the second sources of light in the second column may be configured in a specific arrangement, such that they may be essentially nearest neighbors in different columns. In specific embodiments, a plurality of couples (within the first set) of each a second source of light and a fifth source of light are configured in rows.

In view of the desire to prevent pixilation, pitches may be chose such, that pixilation may be minimized. Herein, the term "pixilation" especially indicates that when the sources of light provide light, they may be observed as individual pixels, instead of a more elongated source of light. The latter may be more desirable than the former.

In embodiments, the first sources of light have a first pitch (P1) and wherein the fifth sources of light have a fifth pitch (P1). In specific embodiments, P5≤P1. In other embodiments P5≥P1. In yet further embodiments, ⅓≤P5/P1≤3, such as 0.5≤P5/P1≤2.

Further, in specific embodiments the number of third sources of light, fourth sources of light and fifth sources of light may about be equal. Hence, in specific embodiments n3, n4, and n5 mutually differ at maximum within 15% of an average value for n3, n4, and n5. Also this may reduce pixilation.

Ratios of a fifth number of fifth sources of light to a third number of third sources of light may in embodiments be selected from the range of 0.5:1-3:1, such as selected from the range of 1:1-2:1. Ratios of a fifth number of fifth sources of light to a fourth number of fourth sources of light may in embodiments be selected from the range of 0.5:1-3:1, such as selected from the range of 1:1-2:1. Ratios of a fifth number of fifth sources of light to a first number of first sources of light may in embodiments be selected from the range of 0.4:0.6-0.5:0.5. However, other ratios may also be possible (as the fifth sources of light are not necessarily available in all embodiments. Ratios of a first number of first sources of light to a second number of second sources of light may in embodiments be selected from the range of 0.5:1-4:1, such as selected from the range of 1:1-2:1.

As indicated above, a luminescent material may be used to convert at least part of the light of a light source, such as especially a solid state light source, thereby providing light of a source of light comprising luminescent material light. In embodiments, the luminescent material may be available in a chip package, like on an LED die. Such embodiments are herein also indicated as P LED. Alternatively or additionally, the luminescent material may be proved in a coating layer on a light source, such as especially a solid state light source. This is known in the art for embodiments of LED filaments (see also above).

Hence, in embodiments the LED filament device may further comprise a luminescent material, wherein the first sources of light are especially based on (a) first light sources configured generate first light source light, and (b) the luminescent material, configured downstream of the first light sources and configured to convert at least part of the first light source light into luminescent material light. Especially, in embodiments the first light comprises the first light source light and the luminescent material light. Further, as indicated above, in embodiments the first light sources comprise solid state light sources. In this way, the first source of light may be based on a luminescent material.

However, also other embodiments may be provided, e.g. to generate the second light, or to generate the third light, or the fourth light or the fifth light.

Referring to the second light, in embodiments the LED filament device may further comprise a luminescent material, wherein the second sources of light are especially based on (a) second light sources configured generate second light source light, and (b) the luminescent material, configured downstream of the second light sources and configured to convert at least part of the second light source light into luminescent material light. Especially, in embodiments the second light comprises the second light source light and the luminescent material light. Further, as indicated above, in embodiments the second light sources comprise solid state light sources. In this way, the second source of light may be based on a luminescent material.

Note that the luminescent material for these luminescent material based embodiments of the second source of light may be different from the luminescent material for the luminescent material based embodiments of first second source of light. However, in embodiments the second light sources for these luminescent material based embodiments of the second source of light may be different from the first light sources for the luminescent material based embodiments of first second source of light, though in other embodiments they may also be of the same type. For instance, would the same type of blue LEDs be used, such as especially from the same bin, the light sources for the first source of light and the light sources for the second source of light may be controlled individually.

Hence, in more general embodiments wherein a source of light may be based on a luminescent material, in embodiments the LED filament device may further comprise a luminescent material, wherein the a source of light is especially based on (a) a light source, especially a solid state light source, configured generate light source light, and (b) the luminescent material, configured downstream of the light sources and configured to convert at least part of the light source light into luminescent material light. Especially, in embodiments the light of the source of light may comprise the luminescent material light, an in specific embodiments also the light source light (when there is no full conversion). In this way, a source of light may be based on a luminescent material.

As indicated above, the fifth source of light may be configured to generate red light. This red light may not easily be absorbed by a luminescent material that is configured to generate one or more of green, yellow, and orange, or even red luminescent material light. Hence, this also allows to combining light sources that are used in combination with a luminescent material in a configuration where both the fifth source of light and the light source for the other source of light may be configured upstream of the luminescent material. The luminescent material may convert at least part of the light source light of the other light source and may (essentially) transmit the light of the fifth source of light.

Hence, in embodiments the fifth sources of light comprise fifth light sources, wherein the fifth light sources are configured to generate fifth light source light, wherein the fifth light comprises the fifth light source light; wherein the LED filament device comprises a light transmissive material wherein the luminescent material is embedded, wherein the light transmissive material (with the luminescent material embedded therein) is configured downstream of both the first light sources and the fifth light sources, wherein the light transmissive material (with the luminescent material embedded therein) is transmissive for the fifth light source light. Further, as indicated above, in embodiments the fifth light sources may comprise solid state light sources. Note that the fifth light and the fifth light source light may essentially be the same, as the fifth source of light may be the fifth light source, such as a red emitting LED.

Note that in embodiments wherein the third sources of light may comprise third light sources and the fourth sources of light may comprise fourth light sources. Especially, these may be solid state light sources, which are of different bins and may in embodiments be direct LEDs.

In embodiments, the first sources of light comprise first light sources, especially first solid state light sources, which in combination with a luminescent material provide the first light. Further, in embodiments the second sources of light comprises second light sources, especially second solid state light sources, which in combination with a (different) luminescent material provide the second light. The first light sources and the second light sources may be of the same bin. The first light sources and the third light sources may be of the same bin. The second light sources and the third light sources may be of the same bin. The first light sources and the second light source and the third light sources may be of the same bin. The former two may in embodiments be applied in combination with luminescent materials, and the latter may in embodiments be used as source of blue light (third light).

Hence, the LED filament device may comprise first light sources, second light sources, third light sources, and fourth light sources, and optionally fifth light sources. As indicated above, in specific embodiments the first light sources and the second lights sources may be of the same bin. Especially, the first light sources (of at least the first set) may be controlled as (first) subset of first light sources. Especially, the second light sources (of at least the second set) may be controlled as (second) subset of second light sources.

Especially, the third light sources (of at least the third set) may be controlled as (third) subset of third light sources. Especially, the fourth light sources (of at least the fourth set) may be controlled as (fourth) subset of fourth light sources. Especially, the (optional) fifth light sources (of at least the (optional) fifth set) may be controlled as (fifth) subset of (optional) fifth light sources. Especially, all light sources may be solid state light sources. In specific embodiments, a control system may individually control the first, second, third, and fourth subsets, and the optional fifth subset.

The third light sources may be configured to generate third light source light. The third light may essentially be the third light source light. For instance, the third source of light may be a direct LED. The fourth light sources may be configured to generate fourth light source light. The fourth light may essentially be the fourth light source light. For instance, the fourth source of light may be a direct LED. The fifth light sources may be configured to generate fifth light source light. The fifth light may essentially be the fifth light source light. For instance, the fifth source of light may be a direct LED.

Especially, the LED filament device is configured to generate LED filament device light. Further, in embodiments the spectral properties of the filament device light may be controllable. For instance, one or more of CRI, CCT, and color point may be controlled.

Hence, in embodiments the LED filament device may further comprises a control system, or may be functionally coupled to a control system. Especially, the control system may be configured to control one or more of a spectral power distribution, color rendering index, correlated color temperature, and color point of the filament device light by individually controlling one or more of the first sources of light, the second sources of light, the third sources of light, the fourth sources of light, and optionally the fifth sources of light.

The term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc.. Beyond that, the term "controlling" and similar terms may additionally include monitoring. Hence, the term "controlling" and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The control system may also be configured to receive and execute instructions form a remote control. In embodiments, the control system may be controlled via an App on a device, such as a portable device, like a Smartphone or I-phone, a tablet, etc.. The device is thus not necessarily coupled to the lighting system, but may be (temporarily) functionally coupled to the lighting system. Hence, in embodiments the control system may (also) be configured to be controlled by an App on a remote device. In such embodiments the control system of the lighting system may be a slave control system or control in a slave mode. For instance, the lighting system may be identifiable with a code, especially a unique code for the respective lighting system. The control system of the lighting system may be configured to be controlled by an external control system which has access to the lighting system on the basis of knowledge (input by a user interface of with an optical sensor (e.g. QR code reader) of the (unique) code. The lighting system may also comprise means for communicating with other systems or devices, such as on the basis of Bluetooth, WIFI, LiFi, ZigBee, BLE or WiMAX, or another wireless technology.

The system, or apparatus, or device may execute an action in a "mode" or "operation mode" or "mode of operation". Likewise, in a method an action or stage, or step may be executed in a "mode" or "operation mode" or "mode of operation" or "operational mode". The term "mode" may also be indicated as "controlling mode". This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability). Hence, in embodiments, the control system may control in dependence of one or more of an input signal of a user interface, a sensor signal (of a sensor), and a timer. The term "timer" may refer to a clock and/or a predetermined time scheme. The control system may be used to control the filament light in operational modes in different colors or different correlated color temperatures. Different colors or different color temperatures especially imply different color points.

In embodiments, in a first operational mode, the LED filament device may be configured to generate filament light having a CCT of at maximum 2400 K, such as at maximum 2300 K, like at maximum 2000 K, such as selected from the range of 1800-2300 K, like selected from the range of 1800-2100 K, while in further specific embodiments have a color point within 10 SDCM from the BBL. In embodiments in a second operational mode, the LED filament device may be configured to generate filament light having a CCT of at minimum 2700 K, such as at minimum 3000 K, like in embodiments at minimum 3500 K, such as selected from the range of 2700-6500 K, like selected from the range of 3000-6500 K, while in further specific embodiments having a color point within 10 SDCM from the BBL. Especially, the CRI may be at least 80, such as at least 85.

In embodiments, in an operational mode (cool) white light may be provided by the second sources of light only. In other embodiments, in an operational mode (cool) white light may be provided by the second sources of light and optionally one or more of the third sources of light and the fourth sources of light. In this way, the CCT may be controllable while staying relatively close the BBL. Further, in this way, the CCT may be at least 2700 K, or (much) higher; see also above. In embodiments, in an operational mode (warm)

white light may be provided by the first source of light only. In other embodiments, in an operational mode (warm or even warmer) white light may be provided by the first sources of light and the fifth sources of light. Further, in this way the CCT may be low, such as at maximum 2400 K, or (substantially) lower, such as even below 2200 K, like below 2100 K.

Some further embodiments are described below.

Further, in specific embodiments the LED filament may have a spiral shape or a helical shape. This may especially be useful when applying in retrofit lamps. Such lamps may comprise one or more of the LED filaments.

As indicated above, the LED filament may comprise a (light transmissive) encapsulant which may at least partly enclose the solid state light source(s), especially at least enclose the light emitting surface(s) of the solid state light sources(s), such as the die(s). The encapsulant may comprise a light transmissive material. Especially, in embodiments the light transmissive material may comprise polymeric material, such as a resin. Alternative embodiments, however, may also be possible. In specific embodiments the light transmissive material may comprise a luminescent material (see also above). Alternatively or additionally, in specific embodiments the light transmissive material may comprise a light scattering material. In further specific embodiments, the light transmissive material may comprise a light transmissive host material, like a polymeric material, such as a resin, and the luminescent material. The luminescent material may be embedded in the light transmissive host material. In further specific embodiments, the light transmissive material may comprise a light transmissive host material, like a polymeric material, such as a resin, and a scattering material. The scattering material may be embedded in the light transmissive material. The scattering material may comprise light reflective particles. Instead of the term "light transmissive material" also the term "optically transmissive material" may be applied.

In embodiments, all light solid state light sources may be at least partly embedded in the light transmissive material. In other embodiments, a subset of the solid state light sources may at least partly be embedded in the light transmissive material. Especially, the term "partly embedded" may indicated that light escaping from the solid state light sources can substantially only escape via the light transmissive material.

When the light transmissive material comprises scattering material, and no luminescent material, in embodiments all solid state light sources may be partly embedded in the light transmissive material. When the light transmissive material comprises luminescent material, the solid state light sources of which the light is at least partly converted by the luminescent material, may be partly embedded. However, also other solid state light sources may be partly embedded in the light transmissive material, when the light transmissive material is substantially transmissive for the light of such other light generating devices.

In embodiments, one or more, especially all, of the first (solid state) light sources may be embedded in a light transmissive material. Alternatively or additionally, one or more, especially all, of the second (solid state) light sources may be embedded in a light transmissive material. Alternatively or additionally, one or more, especially all, of the fifth (solid state) light sources may be embedded in a light transmissive material.

Especially, the LED filament may comprise an (elongated) array of (solid state) light sources. This may be a 1D array or a 2D array. Especially, the term "array" is in embodiments herein used in relation to a filament having at one side (solid state) light sources.

The filament may also have at two sides (solid state) light sources. In such embodiments, there may be two arrays. For each of the array, many of the herein described embodiments relation apply. When referring to filament light, it is referred to all light that is generated with the LED filament. Hence, when there is one array at one side, the filament light may refer to the light generated by the one array (either direction and/or indirectly via the optional luminescent material). However, when there are two arrays at both sides, the filament light may refer to the light generated by both arrays together (either direction and/or indirectly via the optional luminescent material). Especially, the invention may in embodiments be directed to LED filaments with (solid state) light sources at one side of the filament. As indicated above, in specific embodiments a light transmissive support may be applied.

In embodiments the LED filament device may comprise at plurality of first sets. For instance, the LED filament may comprise at least 5 sets.

LED filaments as such are known, and are e.g. described in U.S. Pat. No. 8,400,051 B2, WO2020016058, WO2019197394, etc., which are herein incorporated by reference. U.S. Pat. No. 8,400,051 B2, for instance, incorporated herein by reference, describes a light-emitting device comprising: an elongated bar-shaped package with left and right ends, the package being formed such that a plurality of leads are formed integrally with a first resin with part of the leads exposed; a light-emitting element that is fixed onto at least one of the leads and that is electrically connected to at least one of the leads; and a second resin sealing the light-emitting element, wherein the leads are formed of metal, an entire bottom surface of the light-emitting element is covered with at least one of the leads, an entire bottom surface of the package is covered with the first resin, the first resin has a side wall that is integrally formed with a portion covering the bottom surface of the package and that is higher than upper surfaces of the leads, the first resin and the second resin are formed of optically transparent resin, the second resin that is filled to a top of the side wall of the first resin and that includes a fluorescent material having a larger specific gravity than that of the second resin, the leads have outer lead portions that are used for external connection and that protrude in a longitudinal direction of the package from the left and right ends wherein the fluorescent material is arranged to concentrate near the light emitting element, and is excited by part of light emitted by the light-emitting element so as to emit a color different from a color of the light emitted by the light-emitting element, and the side wall transmits part of light that is emitted by the light-emitting element and that enters the side wall and part of light emitted from the fluorescent material to the portion covering the bottom surface of the package.

In embodiments, one or more filaments, especially all filaments, may have a substantial straight shape. In yet other embodiments, one or more filaments, especially all filaments, may have a curved shape. In yet other embodiments, one or more filaments, especially all filaments, may have a spiral shape. In yet other embodiments, one or more filaments, especially all filaments, may have a helical shape. When two or more filaments have spiral shapes or helical shapes, in embodiments two of these may have similarly configured windings. Other shaped filaments may also be possible, such as having the shape of characters, such as of letters, of numbers, of flowers, of leaves, or other shapes.

Especially, in embodiments the filament(s) has (have) a spiral shape or a helical shape.

The light generating device may in general comprise a light transmissive envelope ("bulb"), such as a light transparent envelope, such as in embodiments a glass envelope. The envelope may at least partly, even more especially substantially, enclose the one or more filaments. The light transmissive envelop may have an envelope height (e.g. defined by the standard shapes B35, A60, ST63, G90, etc.). The first supporting structure may have e length of at least 20% of the height light transmissive envelope, such as in embodiments up to about 80%. Especially, the envelope is transparent for (visible) light.

Further, the light generating device may comprise a screw cap, like of the type E27, though other connectors, for e.g. connecting to a socket, may also be possible.

In yet a further aspect, the invention also provides a LED filament device as defined herein, wherein the LED filament device is a retrofit lamp. In yet a further aspect, the invention also provides a lamp or a luminaire comprising the LED filament device as defined herein. The luminaire may further comprise a housing, optical elements, louvres, etc. etc. . . . The lamp or luminaire may further comprise a housing enclosing the light generating device. The lamp or luminaire may comprise a light window in the housing or a housing opening, through which the system light may escape from the housing.

Especially, in embodiments the invention provides a LED filament device as defined herein, wherein the LED filament device is a retrofit lamp; and wherein the LED filament has a spiral shape or a helical shape.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily to scale.

DETAILED DESCRIPTION OF THE EMBODIMENTS

Figure 1A:
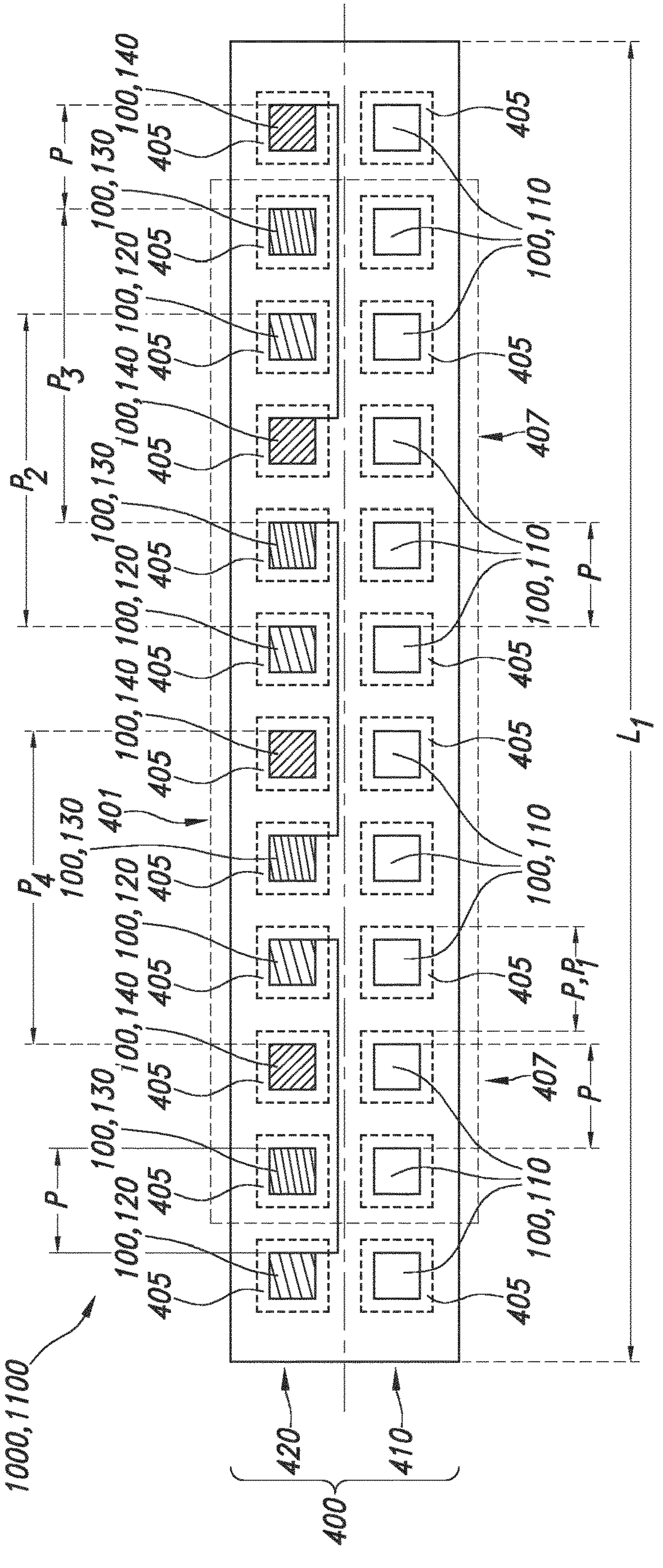
FIGS. 1*a*-1*e* schematically depict embodiments and some aspects.

FIG. 1*a* schematically depicts an embodiment of a LED filament device 1000 comprising a LED filament 1100. The LED filament 1100 comprises a plurality of sources of light 100. IN embodiments, the plurality of sources of light 100 comprises first sources of light 110, second sources of light 120, third sources of light 130, and fourth sources of light 140. Also fifth sources of light may be possible, see below. The LED filament 1100 may have a length L1 along a length axis (see dashed line).

Especially, the sources of light 110,120,130,140 may be configured in an k*l array 400 with k=2 columns 410,420 and each l≥10 sections 405. Here, there are 2×12 section 405.

In embodiments, the array 400 may comprise at least a single first set 401 of at least $1_1$ sections 405 in each of the columns 410,420. Especially, wherein $1_1$=10. Hence, the first set 401 includes a first column (part) with 10 sections 405, and a second column (part) with also 10 sections 405.

Here, the first set 401 may comprise at least 10 sources of light 100 in the first column 410 and at least 10 source of light 100 in the second column 410. In this embodiment, all sources of light 100 may be considered to be in the first set.

In embodiments, each section comprises a light source, especially a solid state light source (see also below).

As schematically depicted, in embodiments for the first set 401 may apply one or more of, especially all of: (a) more than 50% of a total number of n1 first sources of light 110 in the first set 401 are configured in a first column 410 of the array 400, (b) more than 50% of each of n2 second sources of light 120, n3 third sources of light 130, and n4 fourth sources of light 140 in the first set 401 are configured in a second column 420 of the array 400. Further, especially in embodiments may apply one or more of, especially all of; (i) n1≥4, (ii) n2≥2, (iii) n3≥2, and (iv) n4≥2.

Reference 100 refers to the sources of light in general.

Reference P refers to the pitch of the sources of light 100. Note that effectively the pitches P may be the pitch of the solid state light sources of the sources of light 100. Reference P1 refers to the pitch between the first sources of light 110. Note that effectively the pitch P1 may be the pitch of the respective solid state light sources of the first sources of light. Likewise, reference P2 refers to the pitch between the second sources of light 120. Note that effectively the pitch P2 may be the pitch of the respective solid state light sources of the second sources of light. Reference P3 refers to the pitch between the third sources of light 130. Note that effectively the pitch P3 may be the pitch of the respective solid state light sources of the third sources of light. Reference P4 refers to the pitch between the fourth sources of light 140. Note that effectively the pitch P4 may be the pitch of the respective solid state light sources of the fourth sources of light. Especially, in embodiments P3>P and P4>P. Further, in embodiments P2>P.

Figure 1B:
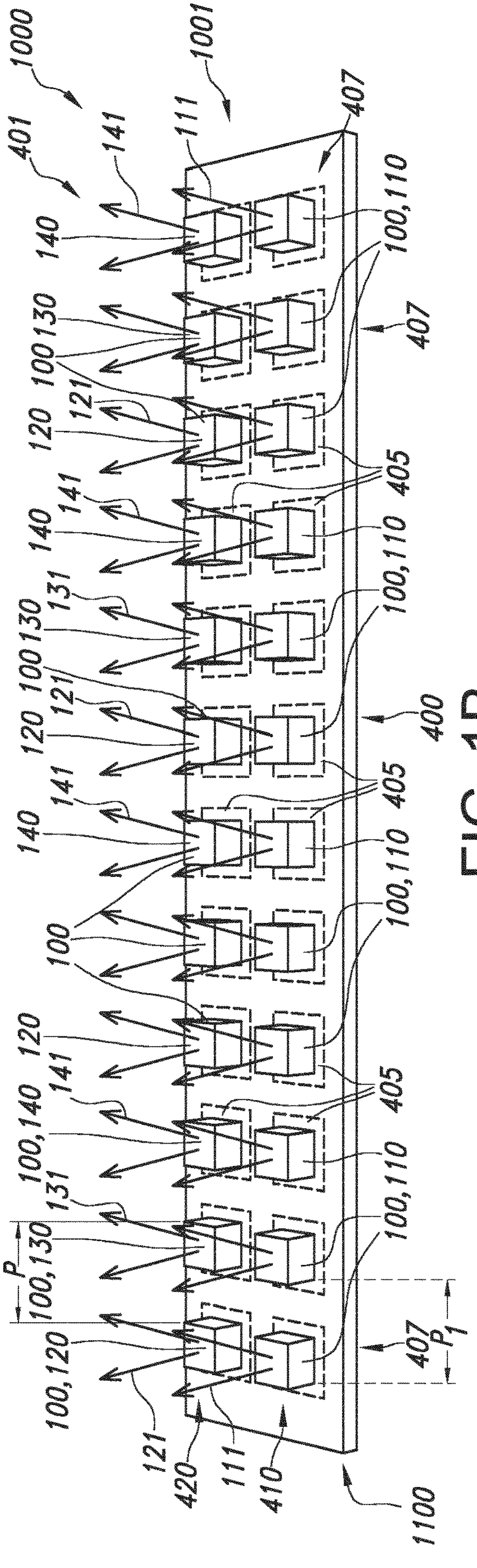

FIG. 1*b* schematically shows a perspective view. Note that the sources of light 100 are not depicted in detail, and the cubes only schematically depict the sources of light 100. Other shapes may also be possible, as well as the combination with a coating layer with a phosphor (see also below).

Here, the first set 401 may comprise at least 10 sources of light 100 in the first column 410 and at least 10 source of light 100 in the second column 410. In this embodiment, all sources of light 100 may be considered to be in the first set.

FIG. 1*b* schematically depicts an embodiment wherein the first sources of light 110 are configured to generate first light $\mathbf{1}_{11}$ having a first correlated color temperature CCT1, the second sources of light 120 are configured to generate second light 121 having a second correlated color temperature CCT2, the third sources of light 130 are configured to generate blue third light 131, and the fourth sources of light 140 are configured to generate green fourth light 141.

Especially, in embodiments CCT1 is selected from the range of at maximum 2400 K, CCT2 is selected from the range of at least 2300 K, and CCT2-CCT1≥500 K. Especially, in embodiments CCT1 may be selected from the range of at maximum 1900-2400 K, CCT2 is selected from the range of 2500-6500 K, and CCT2-CCT1≥1000 K.

For instance, in embodiments in an operational mode the first sources of light 110 in the first set 401 and the third sources of light 130, and fourth sources of light 140 in the first set 401 are together configured to provide white device light 1001 having a correlated color temperature selected from the range of 2700-4000 K.

Figure 1C:
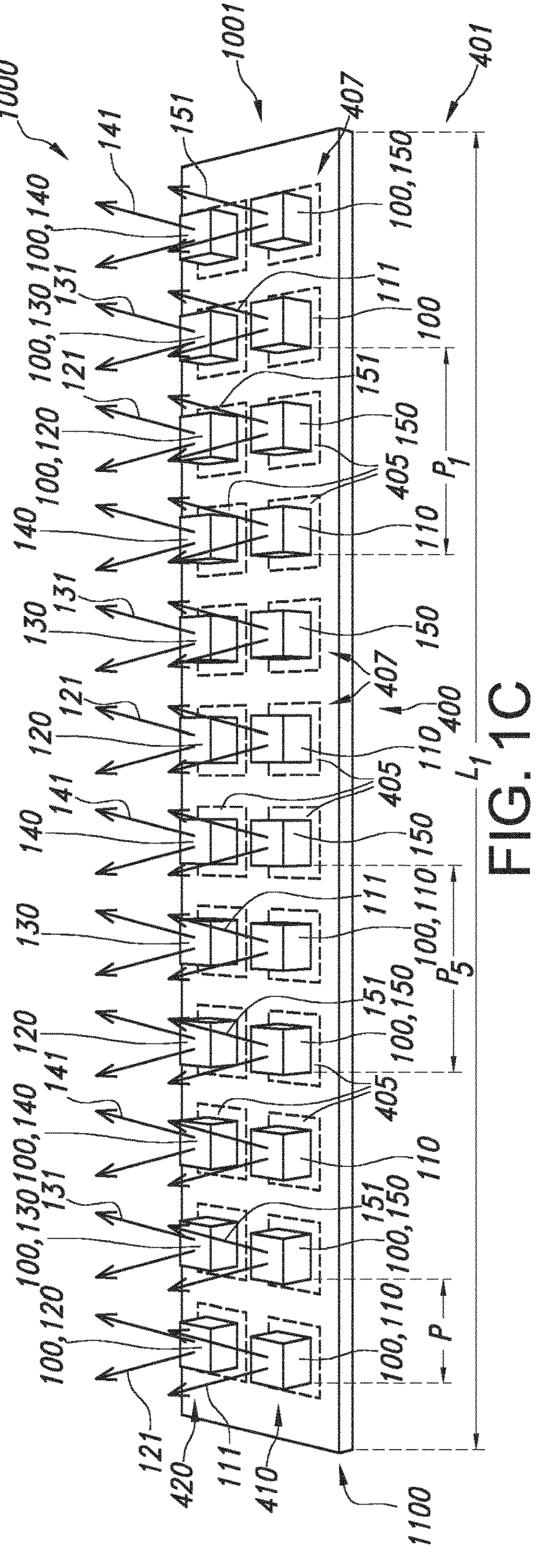

FIG. 1*c* schematically depicts an embodiment also including fifth sources of light. Hence, in embodiments the LED filament device 1000 may further comprising fifth sources of light 150 configured to generate red fifth light 151. Especially, for the first set 401 applies: more than 50% of a total number of n5 fifth sources of light 150 in the first set 401 are configured in the first column 410 of the array 400. Further, in embodiments n5≥2. Here only part of the set 401 is indicated, but see further also e.g. FIG. 1*a*.

Here, the first set 401 may comprise at least 10 sources of light 100 in the first column 410 and at least 10 source of light 100 in the second column 410. In this embodiment, all sources of light 100 may be considered to be in the first set.

In embodiments, in an operational mode the first sources of light 110, the third sources of light 130, the fourth sources of light 140, and the fifth sources of light 150 are together configured to provide white light (1001) having a correlated color temperature selected from the range of 2700-4000 K.

Referring to FIG. 1*c*, in embodiments a plurality of couples (within the first set 401) of each a second source of light 120 and a fifth source of light 150 are configured in rows 407.

Especially, in embodiments the first sources of light 110 have a first pitch P1 and wherein the fifth sources of light have a fifth pitch P1. In embodiments, P5≤P1. In other embodiments, P5≥P1. Further, in embodiments in embodiments P2>P.

Further, in embodiments n3, n4, and n5 mutually differ at maximum within 15% of an average value for n3+n4+n5. However, other ratios may also be possible, see also above, like e.g. 2:1:1 (such as herein depicted).

Referring to FIGS. 1*b* and 1*c* (and also 2*c*), the filament device light 1001 may comprise one or more of first light $\mathbf{1}_{11}$, second light 121, third light 131, fourth light 141, and optionally fifth light 151.

Figure 1D:
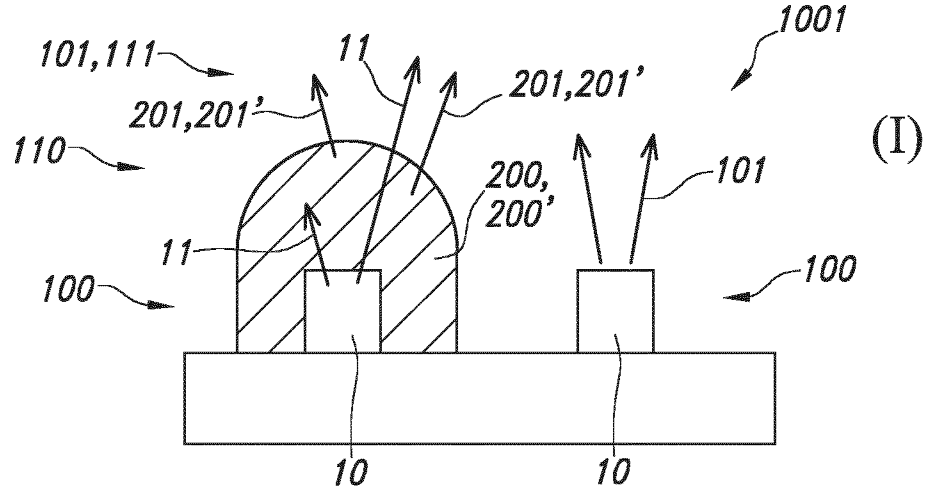
Figure 1D:
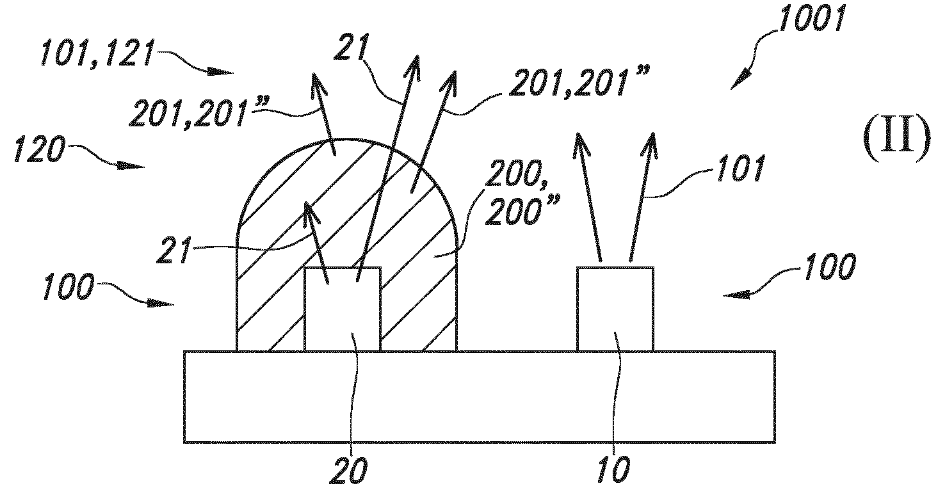

Referring to amongst others FIG. 1*d* (but see also FIGS. 2*a*-2*c*), in embodiments the LED filament device 1000 may further comprise a luminescent material 200.

FIG. 1*d* schematically depicts two embodiments. Both the first embodiment I and the second embodiment II schematically depict embodiments based on a light source, especially a solid state light source, and luminescent material 200. To distinguish the embodiments, the light sources are indicated with references 10 and 20, respectively, and the luminescent materials 200 and their luminescent material light 201, are indicated with 200', 200'', and 201', and 201'', respectively.

In embodiment I, the first sources of light 110 may be based on a first light sources 10 configured generate first light source light 11, and a luminescent material 200, i.e. 200', configured downstream of the first light sources 10 and configured to convert at least part of the first light source light 11 into luminescent material light 201, i.e. 201'. Further, the first light $\mathbf{1}_{11}$ may comprise the first light source light 11 and the luminescent material light 201, i.e. 201'. Especially, the first light sources 10 comprise solid state light sources.

In embodiment II, the second sources of light 120 may be based on a second light sources 20 configured generate second light source light 21, and a luminescent material 200, i.e. 200'', configured downstream of the second light sources 20 and configured to convert at least part of the second light source light 21 into luminescent material light 201, i.e. 201''. Further, the second light 121 may comprise the second light source light 21 and the luminescent material light 201, i.e. 201''. Especially, the second light sources 20 comprise solid state light sources.

In embodiments, the first light sources and second light sources may be from the same bin. Even more especially, the first light sources, the second light sources, and third light sources may be of the same bin. However, especially the luminescent materials for the first source of light and the second source of light are different. Hence, luminescent materials 200' and 200'' may be different. In this way, the first light $\mathbf{1}_{11}$ and the second light 121 may have substantially different CCTs.

Referring to the second light, in embodiments the LED filament device may further comprise a luminescent material (200), wherein the second sources of light are especially based on (a) second light sources (20) configured generate second light source light (21), and (b) the luminescent material (200), configured downstream of the second light sources (20) and configured to convert at least part of the second light source light (21) into luminescent material light (201). Especially, in embodiments the second light (121) comprises the second light source light (21) and the luminescent material light (201). Further, as indicated above, in embodiments the second light sources (20) comprise solid state light sources. In this way, the second source of light may be based on a luminescent material.

Figure 1E:
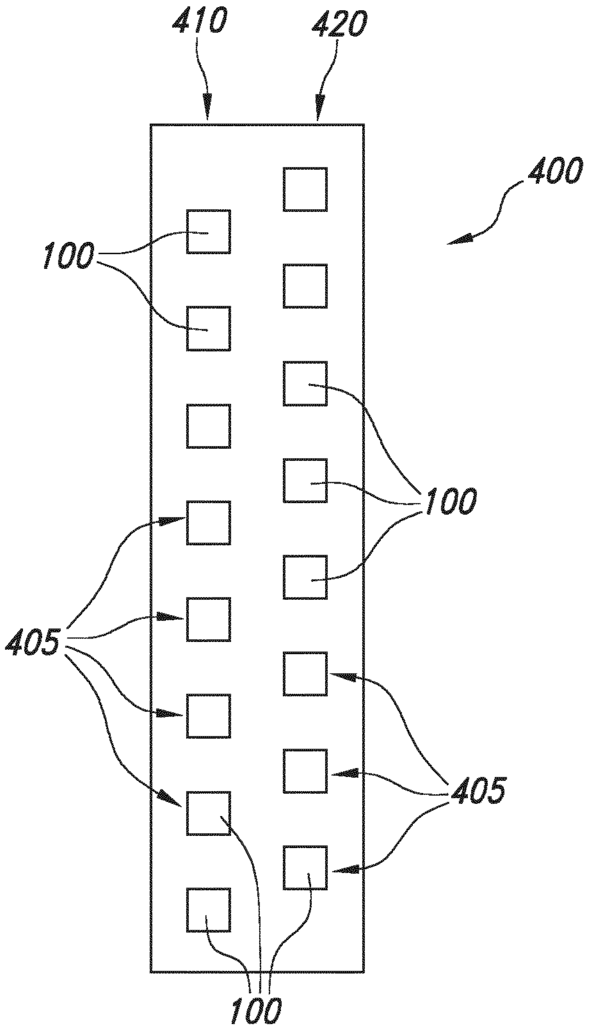

FIG. 1*e* schematically depicts an embodiments wherein the sources of light 100 are not configured in rows being shared by both columns 410,420, but the sources of light 100 in one column are offset relative to the sources of light in the other column. Note that nevertheless the pitches may be the same. However, in other embodiments the pitches between the sources of light in the different columns may also be different.

Figure 2A:
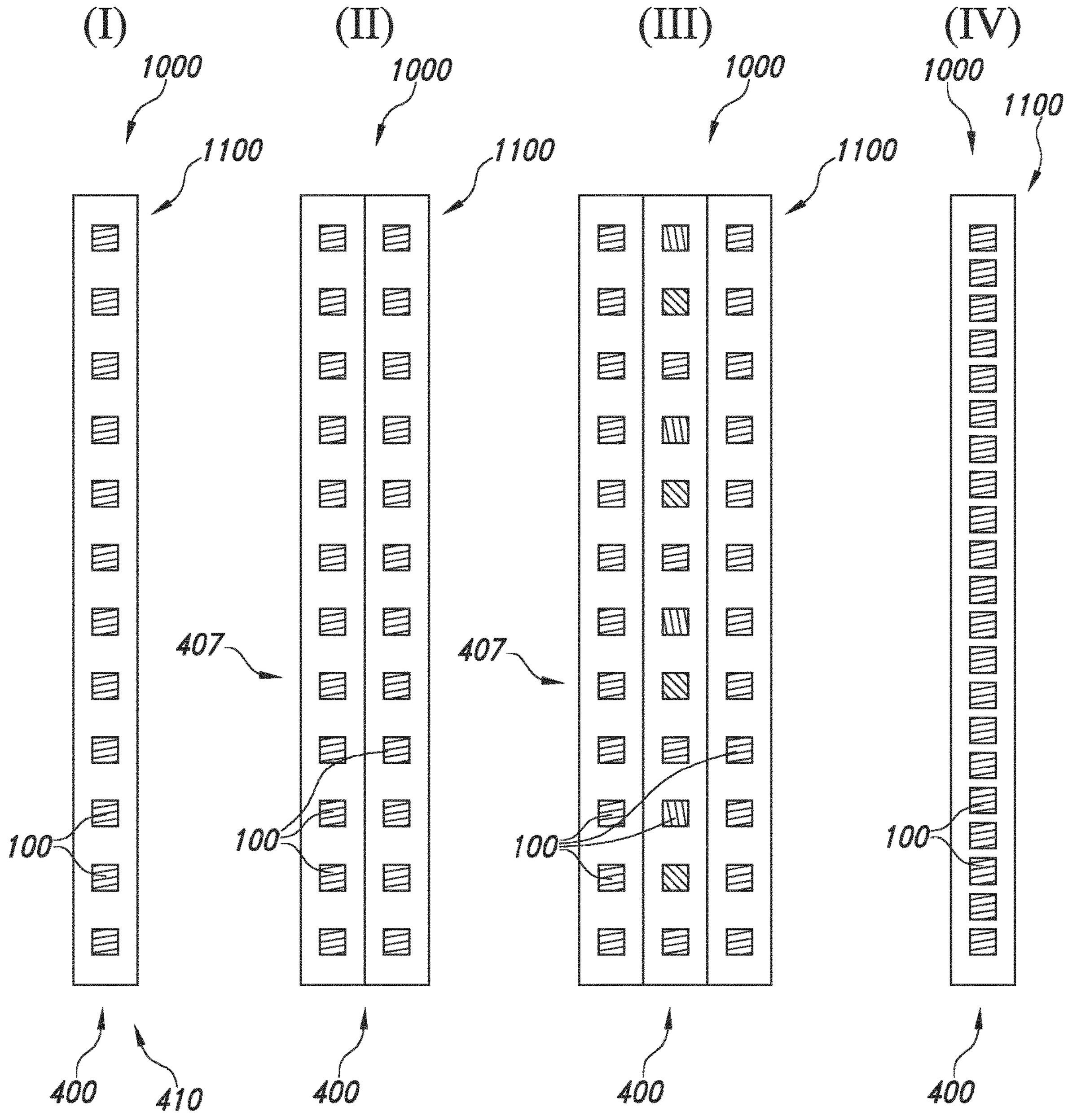
FIGS. 2*a*-2*c* also show aspects and embodiments.

FIG. 2*a* schematically depict some reference examples of LED filaments 1000. Embodiment I may schematically depict a LED filament with a single column, with the solid state light sources embedded in luminescent material, thereby providing a plurality of sources of light 100. The LED filament of embodiment I may be configured to provide white light with a relatively low CCT, such as equal to or below 2300 K. Embodiment I may at lower intensities show spottiness.

FIG. 2*a*, embodiment II, may be essentially the same as embodiment I, with the different that the LED filament includes two columns, with the second column with the solid state light sources embedded in luminescent material, thereby providing a plurality of sources of light 100. This additional column may be configured to provide white light with a relatively high CCT, such as equal to or larger than 4000 K. When individually controlled, different CCT between the highest and the lowest CCT may be provided. However, the white light may not always be desirable close enough to the BBL. Embodiment II may at lower intensities show spottiness.

To solve the latter issue, embodiment III may be proposed, wherein a third column is provided with RGB solid state light sources. In this way, the BBL may be better followed and the color gamut may be larger. Embodiment I II may at lower intensities show spottiness. Further, the width of the filament may be relatively large, which may be less desirable.

Embodiment IV is essentially the same as embodiment I, but now with a smaller pitch. This may reduce spottiness. However, there may essentially be no tunability of the spectral power distribution.

Figure 2B:
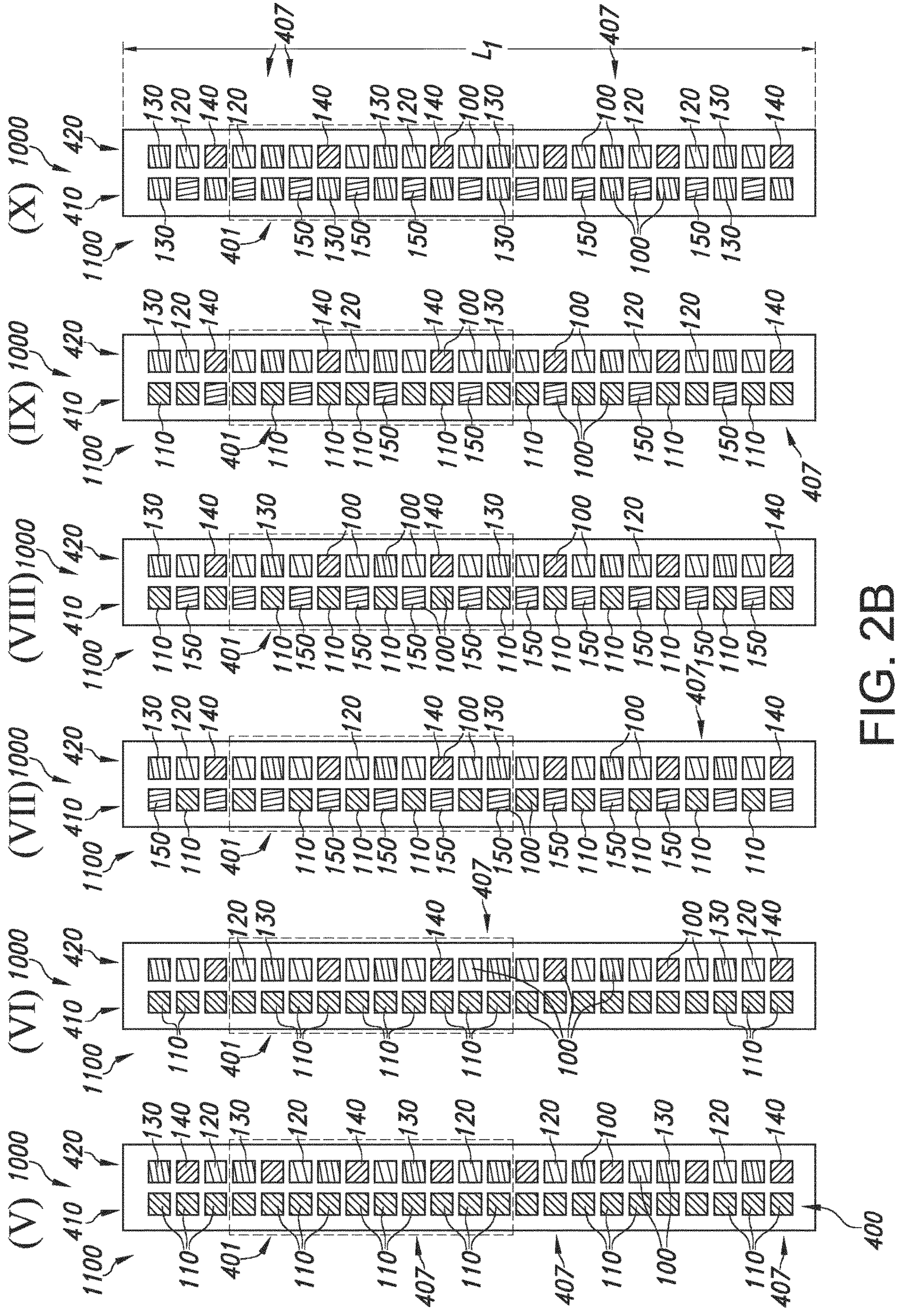

FIG. 2*b*, embodiments V-X schematically depict a number of embodiments which may address one or more of the above indicated problems.

In embodiment V, the first column 410 comprises first sources of light and the second column 420 comprises second sources of light 120, third sources of light 130, the fourth sources of light 140. This may provide a relatively slim variant with reduced or no spottiness.

Embodiment VI is a variant on embodiment V, with relatively more second sources of light 120.

Referring to embodiments VI and VII, the second sources of light 120 (in the first set 401), the third sources of light 130 (in the first set 401), and the fourth sources of light 140 (in the first set 401) may be configured in one or more of (i) an $(BDC)_{m2}$ configuration, see embodiment V, and (ii) an $(BCBD)_{m3}$ configuration, see embodiment VI, wherein B represents the second sources of light 120, C represents the third sources of light 130, D represents the fourth sources of light 140. For instance, m2≥2, and m3≥2.

Embodiments VII-X include embodiments wherein fifth sources of light 150 are provided. This may enlarge the color gamut and may allow higher CRIs. Further, when reducing intensity, still spottiness may be reduced or essentially absent.

Embodiments VII and VIII on the one hand and VI on the other hand are essentially similar with respect to the second column. In embodiment VIII the first sources of light 150 and the second sources of light 120 are aligned. Hence, a plurality of couples (within the first set 401) of each a second source of light 120 and a fifth source of light 150 are configured in rows 407.

Referring to embodiments VII-X, the first sources of light 110 and the fifth sources of light 150 may be configured in an $AE_{m1}$ configuration, wherein A represents the first sources of light 110, E represents the fifth sources of light 150, and wherein m1≥2, wherein for each AE configuration applies that between the respective first source of light 110 and the respective fifth source of light 150 there is at maximum one other source of light 100.

Referring to embodiment X, but also in combination with FIGS. 1*c* and 1*d*, and FIG. 2*a*-2*c*, the fifth sources of light 150 comprise fifth light sources 50, wherein the fifth light sources 50 are configured to generate fifth light source light 51, wherein the fifth light 151 comprises the fifth light source light 51 (like having one or more wavelengths selected from the wavelength range 610-650 nm). Especially, the LED filament device 1000 may comprise a light transmissive material 145 wherein the luminescent material 200 is embedded, wherein the light transmissive material 145 (with the luminescent material 200 embedded therein) is configured downstream of both the first light sources 10 and the fifth light sources 50. The light transmissive material 145 (with the luminescent material 200 embedded therein) may be transmissive for the fifth light source light 51. Especially, the fifth light sources 50 comprise solid state light sources.

Referring to embodiments V-X, in fact all sources of light 100 are aligned in rows 407 over the columns 410,420.

Figure 2C:
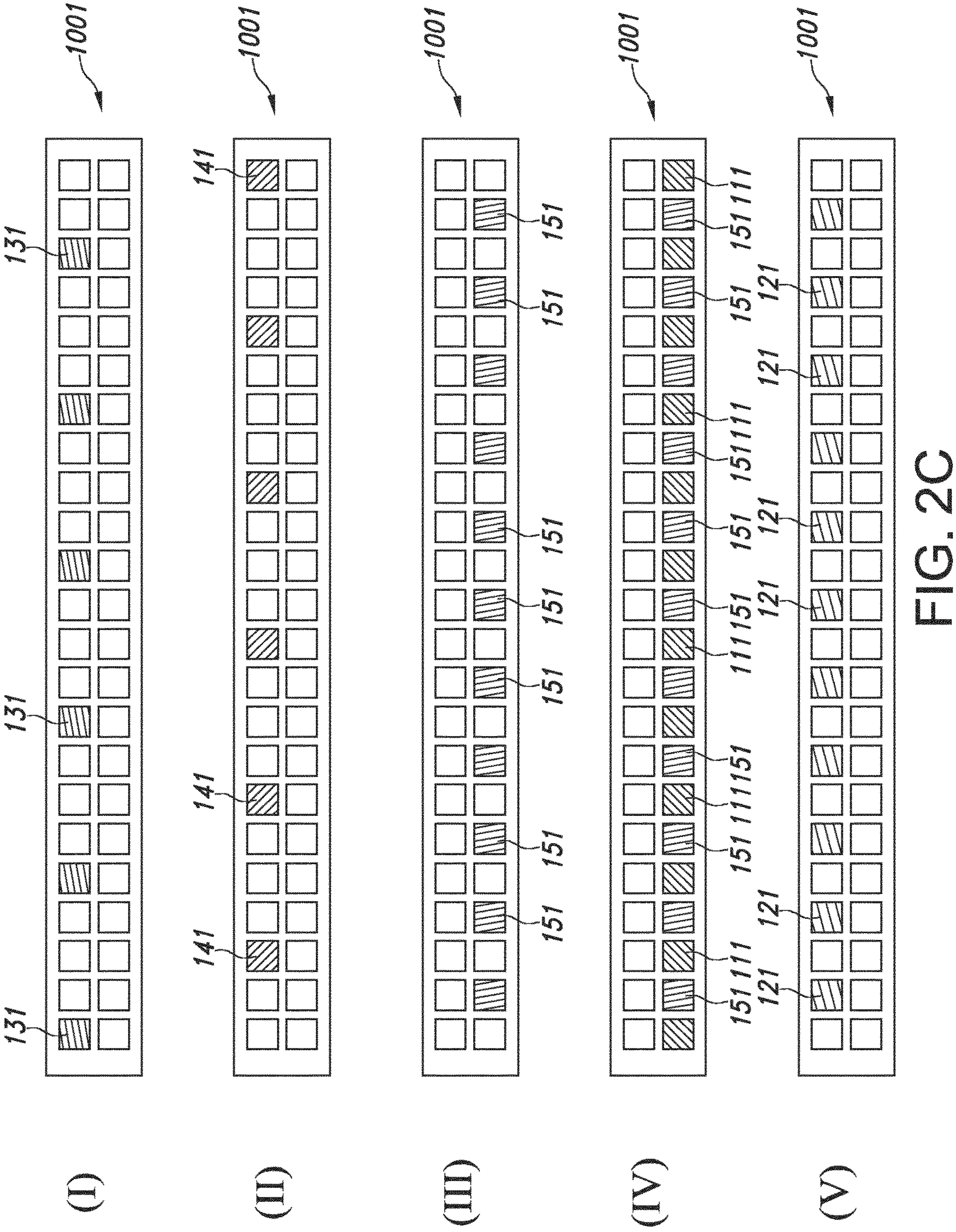

FIG. 2*c* schematically depicts how e.g. embodiment VIII of FIG. 2*b* could be operated. In embodiment I, only the third sources of light 130 provide third light 131 (blue).

In embodiment II, only the fourth sources of light 140 provide third light 141 (green).

In embodiment III, only the fifth sources of light 150 provide third light 151 (red).

In embodiment IV, only the first sources of light 110 and the fifth sources of light 150 provide first light $1_{11}$ and fifth light 151. This may provide warm white, or even extreme warm white. In embodiment V, only the second sources of light 120 provide second light 121 (cool white).

Figure 3:
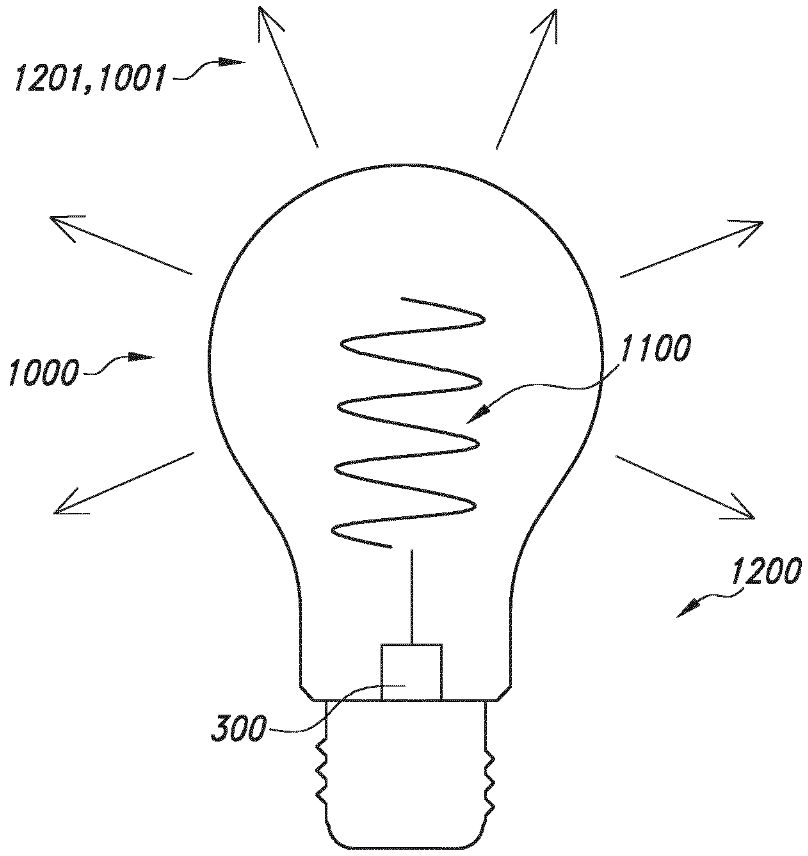
FIG. 3 schematically depict a further embodiment.

FIG. 3 schematically depicts an embodiment of an application of the LED filament device 1000 and/or the lighting device 1200. The lighting device light is indicated with reference 1201, which may consist of the filament device light 1001 (of one or more LED filament devices 1000). The lighting device 1200 may comprise a light transmissive envelope enclosing at least part of the LED filament device 1000.

In embodiments the LED filament device 1000 may further comprise a control system 300 configured to control a color point of the filament device light 1001, or the control system 300 may be functionally coupled to the LED filament device 1000.

FIG. 3 also schematically depicts an embodiment of a lighting device 1200, comprising the LED filament device 1000. The lighting device 1200 may be a retrofit lamp. Further, an embodiment is depicted wherein the filament 1100 has a spiral shape or a helical shape.

Referring to FIG. 3, and also FIGS. 1*c*, and 2*b*, in embodiments the LED filament device 1000 is configured to generate LED filament device light 1001. The LED filament device 1000 may thus further comprise a control system 300 configured to control one or more of a spectral power distribution, color rendering index, correlated color temperature, and color point of the filament device light 1001 by individually controlling one or more of the first sources of light 110, the second sources of light 120, the third sources of light 130, the fourth sources of light 140, and optionally the fifth sources of light 150.

The term "plurality" refers to two or more. The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%. The term "comprise" also includes embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A LED filament device comprising:

a LED filament having a plurality of sources of light, wherein:

the sources of light are configured in an k*l array with k=2 columns, the array having a first set of at least 20 sources of light distributed over the columns, and the sources of light having solid state light sources;

in a first column of the first set, at least 90% of a total number of sources of light are selected from a group consisting of first sources of light and fifth sources of light, with at least 40% of the total number of sources of light having first sources of light, and with 0-60% of the total number of sources of light having fifth sources of light;

in a second column of the first set, at least 80% of the total number of sources of light are selected from a group consisting of second sources of light, third sources of light, and fourth sources of light, and in the second column of the first set at least 20% of the total number of sources of light has second sources of light, at least 20% of the total number of sources of light has third sources of light, and at least 20% of the total number of sources of light has fourth sources of light;

the first sources of light are configured to generate first light having a first correlated color temperature (CCT1), the second sources of light are configured to generate second light having a second correlated color temperature (CCT2), the third sources of light are configured to generate blue third light, the fourth sources of light are configured to generate green fourth light, and the fifth sources of light configured to generate red fifth light; and CCT1 is selected from a range of at maximum 2400 K, CCT2 is selected from a range of at least 2700 K, and CCT2-CCT1≥500 K.

2. The LED filament device according to claim 1, wherein in an operational mode, the first sources of light in the first set and the third sources of light and fourth sources of light in the first set are together configured to provide white device light having a correlated color temperature selected from a range of 2700-4000K.

3. The LED filament device according to claim 1, wherein CCT1 is selected from a range of at maximum 1900-2400 K, CCT2 is selected from a range of 2700-6500 K, and CCT2-CCT1≥1000 K.

4. The LED filament device according to claim 1, wherein more than 90% of a total number of fifth sources of light in the first set are configured in the first column of the array.

5. The LED filament device according to claim 1, wherein in an operational mode, the first sources of light, the third sources of light, the fourth sources of light, and the fifth sources of light are together configured to provide white light having a correlated color temperature selected from a range of 2700-4000 K.

6. The LED filament device according to claim 1, wherein the first sources of light and the fifth sources of light are configured in an $(AE)_{m1}$ configuration, wherein A represents the first sources of light, E represents the fifth sources of light, and m1≥2, wherein between the respective first source of light and the respective fifth source of light for each AE configuration there is at maximum one other source of light.

7. The LED filament device according to claim 1, wherein the second sources of light, the third sources of light, and the fourth sources of light are configured in one or more of (i) an $(BDC)_{m2}$ configuration and (ii) an $(BCBD)_{m3}$ configuration, B represents the second sources of light, C represents the third sources of light, and D represents the fourth sources of light.

8. The LED filament device according to claim 1, wherein a plurality of couples of each of a second source of light and a fifth source of light are configured in rows.

9. The LED filament device according to claim 4, wherein the first sources of light have a first pitch (P1) and the fifth sources of light have a fifth pitch (P1), wherein P5≤P1.

10. The LED filament device according to claim 4, wherein a number n3 of third sources of light, a number n4 of fourth sources of light, and a number n5 of fifth sources of light mutually differ at maximum within 15% of an average value for n3, n4, and n5.

11. The LED filament device according to claim 4, further comprising a luminescent material;

wherein the first sources of light are based on (a) first light sources configured to generate first light source light, and (b) the luminescent material, configured downstream of the first light sources and configured to convert at least part of the first light source light into luminescent material light;

wherein the first light comprises the first light source light and the luminescent material light; and wherein the first light sources comprise solid state light sources.

12. The LED filament device according to claim 11, wherein the fifth sources of light comprise fifth light sources, the fifth light sources are configured to generate fifth light source light, the fifth light has the fifth light source light;

wherein the LED filament device has a light transmissive material, the luminescent material is embedded in the light transmissive material, the light transmissive material is configured downstream of both the first light sources and the fifth light sources, the light transmissive material is transmissive for the fifth light source light; and wherein the fifth light sources comprise solid state light sources.

13. The LED filament device according to claim 1, wherein the LED filament has a spiral shape or a helical shape.

14. The LED filament device according to claim 1, wherein the LED filament device is configured to generate LED filament device light;

wherein the LED filament device further comprises a control system configured to control one or more of a spectral power distribution, color rendering index, correlated color temperature, and color point of the filament device light by individually controlling one or more of the first sources of light, the second sources of light, the third sources of light, the fourth sources of light, and optionally the fifth sources of light.

15. A lighting device, wherein the lighting device is a retrofit lamp comprising a light transmissive envelope enclosing at least part of the LED filament device according to claim 1.

* * * * *